(12) United States Patent
Guidetti et al.

(10) Patent No.: US 10,443,862 B2
(45) Date of Patent: Oct. 15, 2019

(54) CONDITIONING AND/OR HEATING PLANT AND PROCESS OF CONTROLLING THE SAME PLANT

(71) Applicant: FIMCIM S.p.A, Milan (IT)

(72) Inventors: Tiziano Guidetti, Borgomanero (IT); Andrea Chiarello, Ghevio di Meina (IT); Alfredo Cerutti, Grignasco (IT); Roberto Cimberio, Ameno Fraz. Vacciago (IT); Renzo Cimberio, San Maurizio d'opaglio (IT)

(73) Assignee: FIMCIM S.p.A, Milan (IT)

( * ) Notice: Subject to any disclaimer, the term of this patent is extended or adjusted under 35 U.S.C. 154(b) by 383 days.

(21) Appl. No.: 15/260,833

(22) Filed: Sep. 9, 2016

(65) Prior Publication Data
US 2017/0067656 A1  Mar. 9, 2017

(30) Foreign Application Priority Data

Sep. 9, 2015 (IT) .......................... 102015000050079

(51) Int. Cl.
  *F24D 19/10* (2006.01)
  *F24D 3/02* (2006.01)
  (Continued)

(52) U.S. Cl.
  CPC ............ *F24D 19/1048* (2013.01); *F16K 5/04* (2013.01); *F16K 37/00* (2013.01); *F16K 37/005* (2013.01);
  (Continued)

(58) Field of Classification Search
  CPC .... F24D 19/1048; F24D 3/02; F24D 19/1012; F24D 19/1015; F24D 19/1036;
  (Continued)

(56) References Cited

U.S. PATENT DOCUMENTS 3,729,051 A * 4/1973 Mannion .............. G05D 7/0641
                                                                165/246
6,299,071 B1 * 10/2001 Fiedrich .............. F24D 19/1015
                                                                237/70
(Continued)

FOREIGN PATENT DOCUMENTS

CN      2903614    5/2007
CN    102635894    8/2012
(Continued)

OTHER PUBLICATIONS

Italian Search Report conducted in Italian Application No. 102015000050079 dated May 11, 2016.
(Continued)

*Primary Examiner* — Justin M Jonaitis
(74) *Attorney, Agent, or Firm* — Meunier Carlin & Curfman LLC

(57) ABSTRACT

A conditioning or heating plant and a process of controlling the plant, wherein plant comprises at least one circuit for distributing a carrier fluid, having a delivery line, a return line, and a plurality of channels directly or indirectly connected to the delivery line and return line and configured for supplying respective environments to be conditioned and/or heated, at least one heat treatment central group placed on the circuit. The plant has, for each of the channels, at least one respective heat exchange unit and at least one flow-rate regulator.

23 Claims, 12 Drawing Sheets

(51) Int. Cl.
*F24D 10/00* (2006.01)
*F16K 37/00* (2006.01)
*G05D 7/06* (2006.01)
*G05D 23/19* (2006.01)
*F24F 11/83* (2018.01)
*F16K 5/04* (2006.01)
*F24D 3/10* (2006.01)
*F24F 11/84* (2018.01)
*F24F 11/85* (2018.01)

(52) U.S. Cl.
CPC ............ *F16K 37/0041* (2013.01); *F24D 3/02* (2013.01); *F24D 10/00* (2013.01); *F24D 19/1012* (2013.01); *F24D 19/1015* (2013.01); *F24D 19/1036* (2013.01); *F24F 11/83* (2018.01); *G05D 7/0635* (2013.01); *G05D 23/1924* (2013.01); *G05D 23/1928* (2013.01); *F24D 3/10* (2013.01); *F24D 2220/0264* (2013.01); *F24D 2220/0271* (2013.01); *F24D 2220/0292* (2013.01); *F24D 2220/042* (2013.01); *F24D 2220/044* (2013.01); *F24D 2220/046* (2013.01); *F24F 11/84* (2018.01); *F24F 11/85* (2018.01); *Y02B 30/17* (2018.05); *Y02B 30/745* (2013.01)

(58) Field of Classification Search
CPC ............... F24D 3/10; F24D 2220/0264; F24D 2220/222; F24D 2220/0271; F24D 2220/0292; F24D 2220/042; F24D 2220/044; F24D 2220/046; F24F 11/83; F24F 11/84; F24F 11/85; F16K 5/04; F16K 37/00; F16K 37/0041; F16K 37/005; G05D 7/0635; G05D 23/1924; G05D 23/1928; Y02B 30/745
USPC .......................... 165/208, 200, 201, 205, 212
See application file for complete search history.

(56) References Cited

U.S. PATENT DOCUMENTS

| | | | |
|---|---|---|---|
| 2012/0090826 A1* | 4/2012 | Cimberio | F16K 5/0605 165/200 |
| 2013/0008264 A1 | 1/2013 | McDaniel et al. | |
| 2013/0048114 A1* | 2/2013 | Rothman | F24D 19/1012 137/551 |
| 2014/0067135 A1 | 3/2014 | Lehnert et al. | |
| 2014/0083673 A1 | 3/2014 | Thuillard et al. | |
| 2014/0277764 A1 | 6/2014 | Tetzlaff | |
| 2014/0222218 A1* | 8/2014 | D'silva | G01K 17/10 700/276 |

FOREIGN PATENT DOCUMENTS

| | | | | |
|---|---|---|---|---|
| DE | 102012109483 A1 * | 6/2014 | ........ | F24D 19/1009 |
| EP | 0035085 A1 | 9/1981 | | |
| EP | 2441990 | 4/2012 | | |
| KR | 100963146 | 6/2010 | | |
| KR | 100980753 | 9/2010 | | |
| KR | 20100105114 | 9/2010 | | |
| KR | 20120110404 | 10/2012 | | |
| WO | 02086645 | 10/2002 | | |
| WO | 2005081169 | 9/2005 | | |
| WO | 2010074921 | 7/2010 | | |
| WO | 2013013334 | 1/2013 | | |
| WO | 2014131485 | 9/2014 | | |
| WO | 2014183868 | 11/2014 | | |

OTHER PUBLICATIONS

Italian Search Report conducted in Italian Application No. 102015000050044 dated Apr. 28, 2016.
Non-Final Office Action issued in U.S. Appl. No. 15/260,845, dated Mar. 26, 2019.

* cited by examiner

CONDITIONING AND/OR HEATING PLANT AND PROCESS OF CONTROLLING THE SAME PLANT

CROSS REFERENCE TO RELATED APPLICATIONS

This application claims priority to Italian patent application number 102015000050079, entitled "Conditioning and/or Heating Plant and Process of Controlling the Same Plant," filed Sep. 9, 2015, the contents of which are herein incorporated by reference in its entirety.

FIELD OF THE INVENTION

The present invention refers to a conditioning and/or heating plant and a process of controlling the same plant. The invention is useable both in the civilian and in the industrial fields, and advantageously is exploitable for controlling and optimizing hydronic-type plants from the energy point of view.

STATE OF THE ART

As it is known, the heating and/or conditioning plants are increasingly used for maintaining environments, such as rooms destined to the residential or work use, at desired temperature and/or humidity conditions.

Generally, such plants are supplied by a central unit, for example comprising a heating unit (such as a boiler, a heat pump or similar) and/or a refrigerating unit, which provides to deliver, in a suitable distributing circuit, a carrier fluid having desired properties in terms of temperature, flow rate and specific heat. Then, the distributing circuit, in correspondence of the environments to be supplied, comprises one or more thermal treatment units which provide for the heat exchange with the environment.

Controlling the conditioning and/or heating plants is somewhat complicated particularly when there are many environments supplied by the same plant, which therefore is provided with many heat exchange units: in this regard, let's consider plants destined to offices, hotels, or generally complexes wherein there are many separated environments.

It is clear that setting the initial condition of the plant and controlling the compliance with a desired thermal condition in each environment is extremely complicated.

Patent application WO2010074921A2 discloses a technical solution wherein a plant of the above described type exhibits a flow-rate regulator and a heat exchange unit on each fluid line destined to supply a respective environment. The flow-rate regulators can be controlled by suitable control units so that the desired flow rate in each channel complies with values set by the designer, enabling in this way during the installation, to set the flow rates in the several branches of the plant so that they are consistent with the set points defined by the designer.

However, the solution illustrated in the patent application WO2010074921A2 is not capable of managing the plant in order to optimize the energy consumptions. Moreover, such known solution does not lend itself neither to control in real-time the user energy exchange modes, nor to take the flow resistances of the distributing system into account, nor to optimize such resistances.

OBJECT OF THE INVENTION

Therefore, the object of the present invention consists of substantially solving one of the disadvantages and/or limitations of the preceding solutions.

A first object of the invention consists of providing a controlling process for conditioning and/or heating plants, a conditioning and/or heating plant, and a valve for conditioning and/or heating plants, which enable to improve the energy management of a conditioning and/or heating system destined to supply a plurality of separated environments.

Further, it is an object of the invention to offer a solution capable of optimizing in real-time the hydronic flows and/or the thermodynamic conditions of the same in the several branches of a plant, according to a management logic oriented to the energy efficiency and/or comfort.

Then, it is an object of the invention to offer a technical solution capable of finding the optimal conditions of a conditioning and/or heating plant which ensure the lowest possible energy consumption.

One or more of the above described objects which will better appear during the following description, are substantially met by a plant, a process and a valve according to one or more of the attached claims.

Aspects of the invention are described in the following.

In a 1st aspect, it is provided a process of controlling a conditioning and/or heating plant (1), said plant (1) being of a type comprising:
  at least one circuit (2) distributing a carrier fluid, having:
    at least one delivery line (3) of the carrier fluid,
    at least one return line (4) of the carrier fluid, and
    a predetermined number of channels (5) directly or indirectly connected to said delivery line (3) and to said return line (4) and configured for supplying respective environments to be conditioned and/or heated,
  at least one heat treatment central group (6) placed on the circuit (2), for each of said channels (5), the plant (1) further comprising:
    at least one respective heat exchange unit (7) operating on each of said channels (5) for supplying a respective environment to be conditioned and/or heated,
    at least one flow-rate regulator (8) operating on each of said channels (5),
    at least one heat sensor (9) configured for detecting a measured value of a thermal parameter dependent on the temperature difference between a first section of each channel (5) upstream said heat exchange unit (7) and a second section of each channel (5) downstream the same heat exchange unit (7),
    at least one hydraulic sensor (10) configured for determining a measured value of a flow parameter in each channel, said flow parameter comprising one among:
      the flow rate passing through the flow-rate regulator (8), and
      the pressure difference between a first section (5c) of the channel (5) upstream each said flow-rate regulator (8) and a second section (5d) of the same channel (5) downstream the same flow-rate regulator (8),
      the pressure difference between a first section of the channel (5) upstream a calibrated orifice and a second section of the same channel (5) placed downstream the calibrated orifice, the calibrated orifice being placed on each channel, preferably upstream each said flow-rate regulator.

In a 2nd aspect according to the aspect 1, the controlling process comprises, with reference to each of said heat exchange units (7), the following steps:
  receiving at least a desired value of an energy parameter comprising one among:

the thermal power released by the carrier fluid passing through each heat exchange unit (7), the thermal power received by the carrier fluid passing through each heat exchange unit (7), the heat released by the carrier fluid in a predetermined time interval during the passage through each heat exchange unit (7), the heat absorbed by the carrier fluid in a predetermined time interval during the passage through each heat exchange unit (7), calculating, for each heat exchange unit (7), an effective value of said energy parameter as a function of the measured value of the thermal parameter and of the measured value of the flow parameter, comparing, for each heat exchange unit (7), said desired value of the energy parameter with said effective value of the same energy parameter.

In a 3rd aspect according to anyone of the preceding aspects, the controlling process provides to:

command the heat treatment central group (6) to regulate at least one general parameter selected among:

the hydraulic head imposed to the carrier fluid passing through the central group, the heating imposed to the carrier fluid passing through the central group, the cooling imposed to the carrier fluid passing through the central group, command each flow-rate regulator (8) to impose a respective initial value of the energy parameter associated to each heat exchange unit (7), and wherein the step of comparing, for each heat exchange unit (7), said desired value of the energy parameter with said effective value of the same energy parameter in turn provides to verify, for each heat exchange unit (7), if the effective value of the energy parameter deviates more than a predetermined threshold from the desired value of the same energy parameter.

In a 4th aspect according to anyone of the preceding aspects—if, as a result of said comparison step, it results that, for at least one heat exchange unit (7), the effective value of the energy parameter deviates more than a predetermined threshold from the desired value of the same energy parameter—the controlling process further comprises a step of commanding a variation of an operative condition of at least one among:

the flow-rate regulator (8) present on the channel (5) of the heat exchange unit (7), a heat exchange modulator (7a) of said heat exchange unit (7), the heat treatment central group (6).

In a 5th aspect according to the preceding aspect, if, following said comparison step, it results that:

for at least one first of said heat exchange units (7), the effective energy parameter deviates more than a predetermined threshold from the desired value of the same energy parameter, and for at least one further of said heat exchange units (7), different from said first heat exchange unit, the effective value of the energy parameter is inside a predetermined threshold from the desired value of the same energy parameter, the controlling process commands a variation of an operative condition of at least one among:

the flow-rate regulator (8) present on the channel (5) of the first heat exchange unit (7), a heat exchange modulator (7a) of said first heat exchange unit (7).

In a 6th aspect according to anyone of the preceding two aspects—if, following said comparison step, it results that, for the majority or for all the heat exchange units (7), the effective value of the energy parameter deviates more than a predetermined threshold from the desired value of the same energy parameter—the controlling process comprises at least one step of commanding a variation of an operative condition of the thermal treatment central group (6).

In a 7th aspect according to anyone of the preceding three aspects, said plant (1) comprises at least one environment temperature sensor (11) destined to operate at each of said environments supplied by said heat exchange units (7), and wherein the controlling process further provides to:

verify if, for each of said environments, a desired value of the environment temperature deviates more than a predetermined threshold from the value detected by the environment temperature sensor, and if, from said verification, it is determined that the desired value of the environment temperature deviates more than a predetermined threshold from the value detected by the environment temperature sensor, command to vary an operative condition of at least one among:

the flow-rate regulator (8) present on the channel of the heat exchange unit (7), a heat exchange modulator (7a) of said heat exchange unit (7), optionally, the heat treatment central group (6).

In an 8th aspect according to anyone of the preceding four aspects, each flow-rate regulator (8) comprises:

a valve (16) having a valve body exhibiting at least one inlet (17), at least one outlet (18) connected by a respective passage (19) which puts in fluid communication the inlet (17) with the outlet (18), at least one fluid intercepting element (20) operating in said passage, said intercepting element (20) defining, cooperatively with the valve body (16a), a fluid passage opening (21) having a width varying as a function of positions taken by the intercepting element (20) in relation to the valve body (16a), a position sensor (22) configured for determining the positions taken by the intercepting element (20), along a predetermined operative stroke, in relation to the valve body (16a), and for transmitting a respective signal; particularly wherein the intercepting element (20) is configured for taking a plurality of positions along said operative stroke, corresponding to different opening degrees of said passage opening (21) and wherein said position sensor (22), for example an encoder or a potentiometer, is configured for emitting a signal at each step of a predetermined amount executed by the intercepting element (20) along the operative stroke, and wherein the step of commanding a variation of an operative condition comprises varying the position of the intercepting element (20) of said valve (16) for reducing a deviation between an effective value of the energy parameter and a desired value of the same energy parameter.

In a 9th aspect according to anyone of the preceding five aspects, the step of commanding a variation of an operative condition comprises commanding the heat exchange unit (7) to reduce a deviation between the effective value of the energy parameter and the desired value of the same energy parameter.

In a 10th aspect according to the preceding aspect, each heat exchange unit (7) comprises at least one among:

a fan coil unit having at least one fan such as a heat exchange modulator (7a), wherein commanding a variation of an operative condition of the heat exchange unit comprises varying the angular speed of said fan, an air treatment unit having at least one fan such as a heat exchange modulator (7a), wherein commanding a variation of an operative condition of the heat exchange unit comprises varying the angular speed of said fan, a radiator and/or convector unit such as a heat exchange modulator (7a), a heat exchanger, optionally having a modulatable heat exchange surface, such as a heat exchange modulator (7a).

In an 11th aspect according to anyone of the preceding aspects, the heat treatment central group (6) comprises:

at least one pump (12), and at least one unit (13) selected between a heating unit or a refrigerating unit.

In a 12th aspect according to the preceding aspect, the step of said process of commanding a variation of an operative condition, comprises at least one of the following sub-steps:

commanding the pump (12) to vary the hydraulic head across the central group, and reducing a deviation between an effective value of the energy parameter and the desired value of the same energy parameter in relation to a prefixed number of said heat exchange units (7), commanding one between the heating unit and refrigerating unit to vary the temperature of the carrier fluid in the delivery (3) and/or return lines and to reduce a deviation between the effective value of the energy parameter and the desired value of the same energy parameter in relation to a predetermined number of said heat exchange units (7).

In a 13th aspect according to the preceding aspect, the step of commanding one between the heating unit and refrigerating unit is executed only under the condition wherein, in relation to all the heat exchange units (7), it is detected a deviation between the effective value of the energy parameter and the desired value of the same energy parameter greater than a predetermined threshold.

In a 14th aspect according to anyone of the preceding aspects, the heat sensor (9) comprises:

a first heat detector (9a) configured for detecting the temperature in a first section (5a) of a channel (5) upstream said heat exchange unit (7) and a second heat detector (9b) configured for detecting the temperature in a second section (5b) of the same channel (5) downstream the same heat exchange unit (7), or a differential sensor connected to the first section (5a) of a channel (5) upstream the heat exchange unit (7) and to the second section (5b) of each channel (5) downstream the same heat exchange unit (7) and configured for detecting the temperature difference between said first and said second sections (5a, 5b) of each channel (5).

In a 15th aspect according to anyone of the preceding aspects, the hydraulic sensor (10) comprises:

a flow-meter configured for detecting the flow rate passing through the flow-rate regulator (8), or a pressure differential sensor configured for detecting a pressure difference between a first section (5c) of the channel (5) upstream said flow-rate regulator (8) and a second section (5d) of the same channel (5) downstream the same flow-rate regulator (8), or a pressure differential sensor configured for detecting a pressure difference between a first section of a channel (5) upstream a calibrated orifice and a second section of the same channel (5) placed downstream the calibrated orifice, the calibrated orifice being preferably upstream the flow-rate regulator, or a system of two distinct pressure sensors configured for enabling to calculate a pressure difference between a first section (5c) of the channel (5) upstream said flow-rate regulator (8) and a second section (5d) of the same channel (5) downstream the same flow-regulator (8), or a system of two distinct pressure sensors configured for enabling to calculate a pressure difference between a first section of a channel (5) upstream a calibrated orifice and a second section of the same channel (5) placed downstream the calibrated orifice, the calibrated orifice being preferably upstream the flow-rate regulator.

In a 16th aspect according to anyone of the preceding aspects, the step of the process of calculating, for each heat exchange unit (7), an effective value of said energy parameter, comprises:

receiving from the heat sensor (9) the temperatures detected in the first section (5a) and in the second section (5b) of each channel (5), and calculating by them a corresponding detected temperature difference, or directly the detected temperature difference between said first and second sections (5a, 5b) of each channel (5), receiving from the hydraulic sensor (10) directly the detected flow rate passing through the flow-rate regulator (8), or the detected pressure difference and the process providing to calculate the detected flow rate passing through the flow-rate regulator (8) based on such detected pressure difference, calculating the effective value of the energy parameter as a function of the detected flow rate passing through the flow-rate regulator (8), and the detected temperature difference.

In a 17th aspect according to anyone of the preceding aspects, the plant (1) comprises at least one third sensor (14) configured for generating at least one signal in relation to a chemical-physical parameter of the carrier fluid, said parameter comprising at least one among:

the pH of the carrier fluid, the conductivity of the carrier fluid, the concentration of at least a predetermined substance in the carrier fluid.

In an 18th aspect according to the preceding aspect, the process provides the following further steps:

receiving a measured value of said chemical-physical parameter, comparing said measured value with at least one desired value of the chemical-physical parameter, verifying if the effective value of the chemical-physical parameter deviates more than a predetermined threshold from the desired value of the same parameter;

optionally wherein—if, following said comparison step, it results that the effective value of the chemical-physical parameters deviates more than a predetermined threshold from the desired value of the same parameter—the process further comprises a step of emitting an alarm signal and/or signal commanding to vary an operative condition of at least one among:

one or more flow-rate regulators (8), one or more heat exchange units (7), optionally, the heat treatment central group (6).

In a 19th aspect according to anyone of the preceding aspects, the process comprises at least the following steps:

delivering, by the heat treatment central group (6), the carrier fluid from and through the delivery line (3), delivering the fluid to at least one channel (5) for supplying, by the carrier fluid, at least one heat treatment unit (7) operatively active on said channel (5), delivering the fluid to the return line (4) which is directly fluidically communicating with the delivery line (3) upstream the heat treatment central group (6) for therefore defining a closed-type circuit (2).

In a 20th aspect according to anyone of the preceding aspects, all the heat exchange units (7) are operatively active on a respective channel (5) which is directly fluidically communicating with a delivery line (3) and a return line (4) of the carrier fluid for defining a closed-type circuit, the process enabling to recirculate the same carrier fluid inside the distributing circuit (2).

A 21st aspect refers to a conditioning and/or heating plant (1).

A 22nd aspect according to the preceding aspect refers to a conditioning and/or heating plant (1) configured for executing the process of anyone of the aspects from 1 to 20.

In a 23rd aspect according to anyone of the preceding two aspects, the plant comprises:
 at least one circuit (2) distributing a carrier fluid, having:
  at least one delivery line (3) of the carrier fluid,
  at least one return line (4) of the carrier fluid, and
  a predetermined number of channels (5) directly and/or indirectly connected to said delivery line (3) and to said return line (4) and configured for supplying respective environments to be conditioned and/or heated,
 at least one heat treatment central group (6) placed on the circuit (2) and configured for varying at least one among the temperature of the carrier fluid, the hydraulic head imposed to the carrier fluid across the central group, and the flow rate in the carrier fluid,
for each of said channels (5), the plant (1) further comprising:
 at least one respective heat exchange unit (7) operative on each of said channels (5) for supplying a respective environment to be conditioned and/or heated,
 at least one flow-rate regulator (8) operating on each of said channels (5),
 at least one heat sensor (9) configured for detecting a measured value of a thermal parameter dependent on the temperature difference between a first section (5a) of each channel (5) upstream said heat exchange unit (7) and a second section (5b) of each channel (5) downstream the same heat exchange unit (7),
 at least one hydraulic sensor (10) configured for determining a measured value of a flow parameter comprising one among:
  the flow rate passing through the flow-rate regulator (8), and
  the pressure difference between a first section (5a) of each channel (5) upstream said flow-rate regulator (8) and a second section (5b) of each channel (5) downstream the same flow-rate regulator (8),
  the pressure difference between a first section of a channel (5) upstream a calibrated orifice and a second section of the same channel (5) placed downstream the calibrated orifice, the calibrated orifice being placed on each channel, preferably upstream each flow-rate regulator,
 at least one control device (15) communicating with said sensors (9, 10) and active on each flow-rate regulator (8) and on said heat treatment central group (6), the control device (15) being configured for executing the controlling process configured for executing the process of anyone of the aspects from 1 to 20.

In a 24th aspect according to the preceding aspect, the plant comprises at least one environment temperature sensor (11) destined to operate at each of the environments supplied by said heat exchange units (7), and wherein the control device (15) is connected to said environment temperature sensor (11) and configured for executing the process of anyone of the aspects from 1 to 20.

In a 25th aspect according to anyone of the preceding two aspects, each flow-rate regulator (8) comprises:
 a valve (16) having a valve body (16a) exhibiting at least one inlet (17), at least one outlet (18) connected to a respective channel (19) and at least one passage (19a) which puts in fluid communication the inlet (17) with the outlet (18), at least one fluid intercepting element (20) operating in said passage (19a), said intercepting element (20) defining, cooperatively with the valve body (16a), a fluid passage opening (21) having a width variable as a function of positions taken by the intercepting element (20) in relation to the valve body (16a),
 a position sensor (22) configured for determining the positions taken by the intercepting element (20), along a predetermined operative stroke, in relation to the valve body (16a), and for transmitting a respective signal; particularly in case the intercepting element (20) is configured for taking a plurality of positions along said operative stroke, corresponding to different opening degrees of said passage opening (21), and wherein said position sensor (22), for example an encoder or potentiometer, is configured for emitting a signal at each step of a predetermined amount executed by the intercepting element (20) along the operative stroke.

In a 26th aspect according to the preceding aspect, the control device (15) is connected to said position sensor (22), and is active on said valve (16), the control device (15) being configured for executing the process of anyone of the aspects from 1 to 20.

In a 27th aspect according to the preceding aspect, each valve (16) further comprises:
 an actuating member (23) connected to the valve body (16a) and active on the intercepting element (20) for displacing this latter at least between a complete open position, wherein the passage opening (21) exhibits a maximum area, to a closed position, wherein the passage opening (21) is closed;
 a control unit (24) connected to said position sensor (22) and active on the actuating member (23), said control unit (24) being configured for receiving instructions from the control device (15) adapted to command the control unit (24) itself to execute the controlling process of anyone of the aspects from 1 to 19.

In a 28th aspect according to anyone of the preceding five aspects, the plant comprises at least one third sensor (14) configured for generating a signal in relation to a chemical-physical parameter of the carrier fluid, said parameter comprising at least one among:
 the pH of the carrier fluid,
 the conductivity of the carrier fluid,
 the concentration of at least a predetermined substance in the carrier fluid,
wherein the control device (15) is connected to the third sensor (14) and is configured for receiving the signal from said third sensor (14) and for executing the controlling process of anyone of the aspects from 1 to 19.

In a 29th aspect according to anyone of the preceding six aspects, each channel (5) is interposed between a delivery line (3) and a return line (4), each channel (5) being fluidically communicating with a delivery line and a return line (3, 4) which are directly fluidically communicating with each other for defining a closed-type circuit (2) for distributing the carrier fluid.

A 30th aspect refers to a valve of the type configured for being hydraulically inserted in a channel (5) of a conditioning and/or heating plant (1) of a type of anyone of the preceding aspects from 23 to 29, defining a respective flow-rate regulator (8) at a respective channel (5) for transporting a carrier fluid.

In a 31st aspect according to the preceding aspect, said valve (16) comprises:
- a valve body (16a) connectable on said channel (5) and exhibiting at least one inlet (17), at least one outlet (18) and at least one channel (19) defining a passage (19a) which puts in fluid communication the inlet (17) with the outlet (18),
- at least one fluid intercepting element (20) operative in said passage (19a), said intercepting element (20) defining, cooperatively with the valve body (16a), a fluid passage opening (21) having a width varying as a function of positions taken by the intercepting element (20) in relation to the valve body (16a);
- a position sensor (22) configured for generating a signal relating to a relative position taken by the intercepting element (20), along a predetermined operative stroke, in relation to the valve body (16a), and for transmitting said signal;
- an actuating member (23) connected to the valve body (16a) and active on the intercepting element (20) for displacing this latter at least between a complete open position, wherein the passage opening (21) exhibits a maximum area, to a closed position, wherein the passage opening (21) is closed;
- a control unit (24) connected to said position sensor (22) and active on the actuating member (23), said control unit (24) being configured for executing a controlling process according to anyone of the aspects from 1 to 20.

In a 32nd aspect according to the preceding aspect, the intercepting element (20) is configured for taking a plurality of positions along said operative stroke, corresponding to different opening degrees of said passage opening (21), and wherein said position sensor (22), for example an encoder or a potentiometer, is configured for emitting a signal at each step of a predetermined amount executed by the intercepting element (20) along the operative stroke,
and wherein the control unit (24) is configured for executing the step of said process of anyone of the aspects from 1 to 20, of commanding a variation of an operative condition by executing the following sub-steps:
- receiving from said position sensor (22) a signal corresponding to a position of the intercepting element (20) along the respective operative stroke,
- commanding the actuating member (23) to vary the position of the intercepting element (20) of said valve (16), and correspondingly determining a reduction of the deviation between an effective value of the energy parameter and a desired value of the same energy parameter.

In a 33rd aspect according to the preceding aspect, said actuator and said control unit (24) are configured for imposing to the intercepting element displacements at a constant step or a step of amounts increasing as the deviation between the effective value of the operative parameter and the desired value of the same parameter increases.

In a 34th aspect according to anyone of the preceding three aspects, the control unit (24) is physically supported by the valve body (16a) and is configured for communicating, by a wireless or wiring type connection, with the control device (15) of the conditioning and/or heating plant (1), wherein the valve (16) is inserted, said control unit (24) being configured for receiving instructions from the control device (15), adapted to command the control unit (24) itself to execute the controlling process.

A 35th aspect refers to a process for controlling a conditioning and/or heating pant (1), said plant (1) being of a type comprising:
- at least one circuit (2), for distributing a carrier fluid, having:
  - at least one delivery line (3) of the carrier fluid,
  - at least one return line (4) of the carrier fluid, and
  - a plurality of channels (5) directly or indirectly connected to said delivery line (3) and to said return line (4), and configured for supplying respective environments to be conditioned and/or heated,
- at least one heat treatment central group (6) placed on the circuit (2),
- for each of said channels (5), the plant (1) further comprising:
  - at least one respective heat exchange unit (7) operative on each of said channels (5) for supplying a respective environment to be conditioned and/or heated,
  - at least one flow-rate regulator (8) operative on each of said channels (5), for regulating a flow rate of a carrier fluid passing through the respective heat exchange unit (7), wherein each flow-rate regulator (8) comprises at least one valve (16) having a valve body (16a) exhibiting at least one inlet (17), at least one outlet (18) connected by at least one passage (19) which puts in fluid communication the inlet (17) with the outlet (18), and at least one intercepting element (20) operating in said passage (19), said intercepting element (20) defining, cooperatively with the valve body (16a), a fluid passage opening (21) having a width variable as a function of positions taken by the intercepting element (20) in relation to the valve body (16a).

In a 36th aspect according to the preceding aspect, said controlling process provides to:
command the central group (6) to regulate at least one general parameter selected among:
- the hydraulic head imposed to the carrier fluid passing to the central group (6),
- the heating imposed to the carrier fluid passing through the central group (6),
- the cooling imposed to the carrier fluid passing through the central group (6),
- the flow rate imposed to the carrier fluid on the delivery line (3).

In a 37th aspect according to anyone of the preceding two aspects, the process provides to:
command the flow-rate regulator on each of said channels (5) to impose a respective desired value of an operative parameter in relation to each channel wherein a respective flow-rate regulator (8) is present.

In a 38th aspect according to anyone of the preceding three aspects, the controlling process comprises a hydraulic optimization cycle having at least one of the following steps:
commanding the central group (6) to reduce the value of said general parameter, controlling each flow-rate regulator (8) by enlarging said fluid passage opening (21).

In a 39th aspect according to the preceding aspect, the hydraulic optimization cycle alternatively provides to:
firstly, control each flow-rate regulator (8) for enlarging said fluid passage opening (21), and
after, command the central group (6) to reduce the value of said general parameter and to maintain the desired value of the respective operative parameter.

In a 40th aspect according to the aspect 38, the hydraulic optimization cycle alternatively provides to:
firstly, command the central group (6) to reduce the value of said general parameter and, following the reduction imposed to the value of the general parameter,
control each flow-rate regulator (8) by enlarging said passage opening (21) for maintaining the desired value of the respective operative parameter.

In a 41st aspect according to anyone of the aspects from 38 to 40, the steps of controlling and commanding the optimization cycle are cyclically repeated.

In a 42nd aspect according to anyone of the aspects from 38 to 41, the optimization cycle provides a step of verifying if—following the controlling step on each regulator—the plant has reached a desired hydraulic efficiency condition, said desired hydraulic efficiency condition comprising at least one of:
a condition at which there is a flow resistance less than or equal to a minimum flow resistance through one or more flow-rate regulators (8),
a condition at which the passage opening (21) of one or more flow-rate regulators (8) exhibits the maximum area.

In a 43rd aspect according to the preceding aspect when, following the verifying step, it is determined that the plant has reached the desired hydraulic efficiency condition, the controlling process provides a step of interrupting the hydraulic optimization cycle.

In a 44th aspect according to anyone of the aspects from 38 to 43, said operative parameter comprises a flow parameter in each channel (5) selected among:
a flow rate passing through each flow-rate regulator (5),
a pressure difference between a first section (5c) of the channel (5) upstream each said flow-rate regulator (8) and a second section (5d) of the same channel (5) downstream the same flow-rate regulator (8),
a pressure difference between a first section of a channel (5) upstream a calibrated orifice (52) and a second section of the same channel (5) placed downstream the calibrated orifice (52), the calibrated orifice being placed on each channel, preferably upstream each said flow-rate regulator.

In a 45th aspect according to anyone of the aspects from 38 to 43, said operative parameter comprises:
an energy parameter in relation to the heat exchange unit (7) associated to the respective flow-rate regulator (8), said energy parameter being in turn one among:
the thermal power released by the carrier fluid passing through each heat exchange unit (7),
the thermal power received by the carrier fluid passing through each heat exchange unit (7),
the heat released from the carrier fluid in a predetermined time interval during the passage through each heat exchange unit (7),
the heat absorbed by the carrier fluid in a predetermined time interval during the passage through each heat exchange unit (7).

In a 46th aspect according to anyone of the aspects from 38 to 45, imposing a respective desired value of an operative parameter in relation to each flow-rate regulator (8) provides to command the flow-rate regulator based on the deviation between the desired value and a measured value of the respective operative parameter, optionally based on the deviation between the desired value and the measured value of the energy parameter in relation to the corresponding of said heat exchange units (7).

In a 47th aspect according to anyone of the aspects from 35 to 46, said plant (1) comprises:
at least one heat sensor (9) configured for detecting a measured value of a thermal parameter dependent on the temperature difference between a first section (5a) of each channel (5) upstream said heat exchange unit and a second section (5b) of each channel (5) downstream the same heat exchange unit (7).

In a 48th aspect according to the preceding aspect, the heat sensor (9) comprises:
a first heat detector configured for detecting the temperature in a first section (5a) of each channel (5) upstream said heat exchange unit (7) and a second heat detector configured for detecting the temperature in a second section (5b) of each channel (5) downstream the same heat exchange unit (7), or
a differential heat sensor connected to the first section (5a) of each channel (5) upstream said heat exchange unit (7), and to the second section (5b) of each channel (5) downstream the same heat exchange unit (7) and configured for detecting the temperature difference between said first and said second sections (5a, 5b) of each channel (5).

In a 49th aspect according to anyone of the aspects from 35 to 48, said plant (1) comprises at least one hydraulic sensor (10) comprising at least one of:
a flow-meter configured for detecting the flow rate passing through the flow-rate regulator (8), or
a pressure differential sensor configured for detecting a pressure difference between a first section (5c) of the channel (5) upstream said flow-rate regulator (8) and a second section (5d) of the same channel (5) downstream the same flow-rate regulator (8), or
a pressure differential sensor configured for detecting a pressure difference between a first section of a channel (5) upstream a calibrated orifice (52) and a second section of the same channel (5) placed downstream the calibrated orifice (52), the calibrated orifice being preferably upstream the flow-rate regulator, or
a system of two distinct pressure sensors configured for enabling to calculate a pressure difference between a first section (5c) of the channel (5) upstream said flow-rate regulator (8) and a second section (5d) of the same channel (5) downstream the same flow-rate regulator (8), or
a system of two distinct pressure sensors configured for enabling to calculate a pressure difference between a first section of a channel (5) upstream a calibrated orifice and a second section of the same channel (5) placed downstream the calibrated orifice, the calibrated orifice being preferably upstream the flow-rate regulator,
at least one pressure switch configured for emitting a target signal when a pressure difference between a first section (5c) of the channel (5) upstream a flow-rate regulator (8) and a second section (5d) of the same channel (5) downstream the flow-regulator (8) has reached a predetermined minimum value, or at least one pressure switch configured for emitting a target signal when a pressure difference between a first section of a channel (5) upstream a calibrated orifice (52) and a second section of the same channel (5) placed downstream the calibrated orifice has reached a predetermined minimum value, the calibrated orifice being preferably upstream the flow-rate regulator.

In a 50th aspect according to the preceding aspect, the process provides to:
 determine a measured value of the operative parameter based on the detection executed by the only hydraulic sensor, when the operative parameter is a flow parameter or,
 when the operative parameter is said energy parameter, based on the detection executed by the hydraulic sensor and by the heat sensor.

In a 51st aspect according to anyone of aspects from 35 to 50, the plant comprises, for each flow-rate regulator, a position sensor (22) configured for determining the positions taken by the intercepting element (20), along a predetermined operative stroke, in relation to the valve body (16a), and for transmitting a respective signal, particularly wherein the intercepting element (20) is configured for taking a plurality of positions along said operative stroke corresponding to different opening degrees of said passage opening (21) and wherein said position sensor (22), for example an encoder or a potentiometer, is configured for emitting a signal at each step of a predetermined amount performed by the intercepting element (20) along the operative stroke.

In a 52nd aspect according to the preceding aspect, said step of verifying that a desired hydraulic efficiency condition has been reached comprises the following procedure:
 receiving the signal of said position sensor (22) in relation to each of said flow-rate regulators,
 verifying, based on said signal of the position sensor (22), an opening state of the intercepting element (20) of each of said valves,
 determining when the passage opening of a predetermined number of said valves (16) reaches a maximum opening condition of the passage opening,
 establishing that the desired hydraulic efficiency condition has been reached when one or more of said valves reaches the maximum opening condition of the respective passage opening.

In a 53rd aspect according to anyone of the preceding aspects, said step of verifying that a desired hydraulic efficiency condition has been reached comprises the following procedure:
 receiving for each channel (5) said pressure difference from the respective pressure differential sensor or determining for each channel said pressure difference based on the signals supplied by two distinct respective pressure sensors,
 determining when, for a predetermined number of said channels, the pressure difference reaches a predetermined value of a minimum differential pressure,
 determining the desired hydraulic efficiency condition has been reached when for one or more of said channels, the minimum pressure differential predetermined value has been reached.

In a 54th aspect according to the preceding five aspects, said step of verifying that a desired hydraulic efficiency condition has been reached comprises the following procedure:
 determining if said target signal has been received by the respective pressure switch of each channel,
 establishing that the desired hydraulic efficiency condition has been reached when for one or more of said channels has reached said target signal from the respective pressure switch.

In a 55th aspect according to anyone of the preceding four aspects, wherein when is verified that a desired hydraulic efficiency condition has not been reached, the hydraulic optimization cycle provides to displace the intercepting element (22) from one or more of the valves (16) towards a state of greater opening.

In a 56th aspect according to anyone of the aspects from 35 to 55, the heat treatment central group (6) comprises:
 at least one pump (12), and
 at least one unit (13) selected between a heating unit and a refrigerating unit.

In a 57th aspect according to the preceding aspect, the step of regulating at least one general parameter comprises, following an increase of the opening degree of the passage opening of one or more of said valves (16), at least one of the following sub-steps:
 commanding the pump (12) to reduce the hydraulic head across the central group,
 commanding the pump (12) to maintain unchanged the overall flow rate of the carrier fluid,
 commanding the heating unit to reduce the temperature of the delivering and/or returning carrier fluid;
 commanding the refrigerating unit to increase the temperature of the carrier fluid in the delivery and/or return lines.

In a 58th aspect according to anyone of the aspects from 38 to 57, said optimization cycle further comprises:
 if it is determined that the desired hydraulic efficiency condition has been reached, comparing, for each of said channels, said desired value of the operative parameter with said effective value of the same parameter,
 determining, for each of said channels, if the effective value of the operative parameter deviates more than a predetermined threshold from the desired value of the same parameter,
 if, following said comparing steps, it results that, for at least one predetermined number of channels, the effective value of the operative parameter deviates more than a predetermined threshold from the desired value of the same parameter, controlling the heat treatment central group (6) for varying at least one general parameter and reducing the deviation between the effective value of the operative parameter and the desired value of the same parameter,
 repeating the preceding steps until, for each heat exchange unit (7), the effective value of the operative parameter does not deviate past a predetermined threshold of the desired value of the same parameter.

A 59th aspect refers to a conditioning and/or heating plant (1) configured for executing a controlling process according to anyone of the aspects from 35 to 58.

In a 60th aspect according to the preceding aspect, the plant comprises:
 at least one circuit (2) for distributing a carrier fluid, having:
  at least one delivery line (3) of the carrier fluid,
  at least one return line (4) of the carrier fluid, and
  a plurality of channels (5) directly or indirectly connected to said delivery line (3) and to said return line (4), and configured for supplying respective environments to be conditioned and/or heated,
 at least one heat treatment central group (6) placed on the circuit (2), for each of said channels (5), the plant (1) further comprising:
- at least one respective heat exchange unit (7) operating on each of said channels (5) for supplying a respective environment to be conditioned and/or heated,
- at least one flow-rate regulator (8) operating on each of said channels (5), for regulating a flow rate of a carrier fluid passing through the respective heat exchange unit (7), wherein each flow-rate regulator (8) comprises at least one valve (16) having a valve body (16a) exhibiting at least one inlet (17), at least one outlet (18) connected by at least one passage (19) which puts in fluid communication the inlet (17) with the outlet (18), and at least one intercepting element (20) operating in said passage (19), said intercepting element (20) defining, cooperatively with the valve body (16a), a fluid passage opening (21) having a width varying as a function of positions taken by the intercepting element (20) in relation to the valve body (16a),
- at least one control device (15) communicatively connected to and active on each flow-rate regulator (8) and on said heat treatment central group (6), the control device (15) being configured for executing the controlling process according to anyone of the aspects from 35 to 58.

In a 61st aspect according to the preceding aspect, the plant comprises for each channel.
at least one heat sensor (9) configured for detecting a measured value of a thermal parameter dependent on the temperature difference between a first section (5a) of each channel (5) upstream said heat exchange unit and a second section (5b) of each channel (5) downstream the same heat exchange unit (7).

In a 62nd aspect according to the preceding aspect, the heat sensor (9) comprises for each channel.
- a first heat detector configured for detecting the temperature in a first section (5a) of each channel (5) upstream said heat exchange unit (7) and a second heat detector configured for detecting the temperature in a second section (5b) of each channel (5) downstream the same heat exchange unit (7), or
- a differential heat sensor connected to the first section (5a) of each channel (5) upstream said heat exchange unit (7) and to the second section (5b) of each channel (5) downstream the same heat exchange unit (7) and configured for detecting the temperature difference between said first and second sections (5a, 5b) of each channel (5).

In a 63rd aspect according to anyone of the preceding three aspects, the plant comprises for each channel.
at least one hydraulic sensor (10) configured for determining a measured value of the operative parameter,
wherein the hydraulic sensor (10) comprises:
- a flow-meter configured for detecting the flow rate passing through the flow-rate regulator (8), or
- a pressure differential sensor configured for detecting a pressure difference between a first section (5c) of the channel (5) upstream said flow-rate regulator (8) and a second section (5d) of the same channel (5) downstream the same flow-rate regulator (8), or
- a pressure differential sensor configured for detecting a pressure difference between a first section of a channel (5) upstream a calibrated orifice and a second section of the same channel (5) downstream the calibrated orifice, the calibrated orifice being preferably upstream the flow-rate regulator, or
- a system of two distinct pressure sensors configured for enabling to calculate a pressure difference between a first section (5c) of the channel (5) upstream said flow-rate regulator (8) and a second section (5d) of the same channel (5) downstream the same flow-rate regulator (8), or
- a system of two distinct pressure sensors configured for enabling to calculate a pressure difference between a first section of a channel (5) upstream a calibrated orifice and a second section of the same channel (5) downstream the calibrated orifice, the calibrated orifice being preferably upstream the flow-rate regulator,
- at least one pressure switch configured for emitting a target signal when a pressure difference between a first section (5c) of the channel (5) upstream said flow-rate regulator (8) and a second section (5d) of the same channel (5) downstream the same flow-rate regulator (8) has reached a predetermined minimum value, or
- at least one pressure switch configured for emitting a target signal when a pressure difference between a first section of a channel (5) upstream a calibrated orifice and a second section of the same channel (5) placed downstream the calibrated orifice, has reached a predetermined minimum value, the calibrated orifice being preferably upstream the flow-rate regulator.

In a 64th aspect according to anyone of the preceding four aspects, the plant comprises for each channel and each flow-rate regulator, a position sensor (22) configured for determining the positions taken by the intercepting element (20), along a predetermined operative stroke, in relation to the valve body (16a), and for transmitting a respective signal, particularly wherein the intercepting element (20) is configured for taking a plurality of positions along said operative stroke, corresponding to different opening degrees of said passage opening (21), and wherein said position sensor (22), for example an encoder or a potentiometer, is configured for emitting a signal at each step of a predetermined amount executed by the intercepting element (20) along the operative stroke.

In a 65th aspect according to anyone of the preceding five aspects, each valve (16) further comprises:
- an actuating member (23) connected to the valve body (16a) and active on the intercepting element (20) for displacing this latter at least between a complete open position, wherein the passage opening (21) exhibits the maximum area, to a closed position, wherein the passage opening (21) is closed,
- a control unit (24) connected to said position sensor (22) and active on the actuating member (23), said control unit (24) being configured for receiving instructions from the control device (15), adapted to command the control unit (24) itself to execute the controlling process of anyone of the aspects from 35 to 58.

In a 66th aspect according to anyone of the preceding six aspects, each channel (5) is interposed between a delivery line (3) and a return line (4), each channel (5) being fluidically communicating with a delivery line and with a return line (3, 4) which are directly fluidically communicating with each other for defining a closed-type circuit (2) for distributing the carrier fluid.

In a 67th aspect according to anyone of the preceding seven aspects, the heat treatment central group (6) comprises:
- at least one pump (12), and
- at least one unit (13) selected between a heating unit and a refrigerating unit.

In a 68th aspect according to the preceding aspect, the step of adjusting at least one general parameter, which the control device is configured for executing, comprises at least one of the following sub-steps:

commanding the pump (12) to reduce the hydraulic head across the central group, commanding the pump (12) to maintain unchanged the overall flow rate of the carrier fluid despite a reduction of the flow resistances determined by a greater opening state of the intercepting element (20) of said valves (16), commanding the heating unit to reduce the temperature of the delivering and/or returning carrier fluid;

commanding the refrigerating unit to increase the temperature of the carrier fluid in the delivery and/or return line.

A 69th aspect refers to a valve configured for being hydraulically inserted in a channel (5) of a conditioning and/or heating plant (1) of the type according to anyone of the aspects from 60 to 68, by defining a respective flow-rate regulator (8) at a respective channel (5) for transporting the carrier fluid, said valve (16) comprising:

a valve body (16a) connectable on said channel (5) and exhibiting at least one inlet (17), at least one outlet (18) and at least one passage (19) which puts in fluid communication the inlet (17) with the outlet (18), at least one fluid intercepting element (20) operative in said passage (19), said intercepting element (20) defining, cooperatively with the valve body (16a), a fluid passage opening (21) having a width varying as a function of positions taken by the intercepting element (20) in relation to the valve body (16a), an actuating member (23) connected to the valve body (16a) and active on the intercepting element (20) for displacing this latter at least between a complete open position, wherein the passage opening (21) exhibits a maximum area, to a closed position, wherein the passage opening (21) is closed;

a control unit (24) active on the actuating member (23), said control unit (24) being configured for executing a controlling process according to anyone of the aspects from 35 to 58.

In a 70th aspect according to the preceding aspect, the control unit (24) of the valve is connected to one or more of the following sensors, optionally being part of the valve itself:

at least a heat sensor (9) configured for detecting a measured value of a thermal parameter dependent on the temperature difference between a first section (5a) of each channel (5) upstream said heat exchange unit and a second section (5b) of each channel (5) downstream the same heat exchange unit (7), wherein the heat sensor (9) comprises:

a first heat detector configured for detecting the temperature in a first section (5a) of each channel (5) upstream said heat exchange unit (7) and a second heat detector configured for detecting the temperature in a second section (5b) of each channel (5) downstream the same heat exchange unit (7), or a differential heat sensor connected to the first section (5a) of each channel (5) upstream said heat exchange unit (7) and to the second section (5b) of each channel (5) downstream the same heat exchange unit (7) and configured for detecting the temperature difference between said first and said second sections (5a, 5b) of each channel (5), and/or at least one hydraulic sensor (10) configured for determining a measured value of the operative parameter, wherein the hydraulic sensor (10) comprises:

a flow-meter configured for detecting the flow rate passing through the flow-rate regulator (8), or a pressure differential sensor configured for detecting a pressure difference between a first section (5c) of the channel (5) upstream said flow-rate regulator (8) and a second section (5d) of the same channel (5) downstream the same flow-rate regulator (8), or a pressure differential sensor configured for detecting a pressure difference between a first section of a channel (5) upstream a calibrated orifice and a second section of the same channel (5) placed downstream the calibrated orifice, the calibrated orifice being preferably upstream the flow-rate regulator, or a system of two distinct pressure sensors configured for enabling to calculate a pressure difference between a first section (5c) of the channel (5) upstream said flow-rate regulator (8) and a second section (5d) of the same channel (5) downstream the same flow-rate regulator (8), or a system of two distinct pressure sensors configured for enabling to calculate a pressure difference between a first section of a channel (5) upstream a calibrated orifice and a second section of the same channel (5) placed downstream the calibrated orifice, the calibrated orifice being preferably upstream the flow-rate regulator, at least one pressure switch configured for emitting a target signal when a pressure difference between a first section (5c) of the channel (5) upstream said flow-rate regulator (8) and a second section (5d) of the same channel (5) downstream the same flow-rate regulator (8) has reached a predetermined minimum value, or at least one pressure switch configured for emitting a target signal when a pressure difference between a first section of a channel (5) upstream a calibrated orifice and a second section of the same channel (5) placed downstream the calibrated orifice has reached a predetermined minimum value, the calibrated orifice being preferably upstream the flow-rate regulator, and/or a position sensor (22) configured for determining the positions taken by the intercepting element (20), along a predetermined operative stroke, in relation to a valve body (16a), and for transmitting a respective signal, particularly wherein the intercepting element (20) is configured for taking a plurality of positions along said operative stroke corresponding to different opening degrees of said passage opening (21), and wherein said position sensor (22), for example an encoder or a potentiometer, is configured for emitting a signal at each step of a predetermined amount executed by the intercepting element (20) along the operative stroke.

In a 71st aspect according to anyone of the preceding two aspects, the intercepting element (20) is configured for taking a plurality of positions along said operative stroke corresponding to different opening degrees of said passage opening (21) and wherein said position sensor (22), for example an encoder or a potentiometer, is configured for emitting a signal at each step of a predetermined amount executed by the intercepting element (20) along the operative stroke.

In a 72nd aspect according to the preceding aspect, the control unit (24) is configured for executing the step of said process of commanding a variation of an operative condition by executing the following sub-steps:
- receiving from said position sensor (22) a signal corresponding to a position of the intercepting element (20) along the respective operative stroke,
- commanding the actuating member (23) to vary the position of the intercepting element (20) of said valve (16) and to correspondingly determine a reduction of the same deviation between an effective value of the operative parameter and a desired value of the same parameter.

In a 73rd aspect according to the preceding aspect, said actuator and said control unit (24) are configured for imposing to the intercepting element a displacement at a constant step, or a step of amounts increasing as the deviation between the effective value of the operative value and the desired value of the same parameter increases.

In a 74th aspect according to anyone of the preceding five aspects, the control unit (24) is physically supported by the valve body (16a) and is configured for communicating, by a wireless or wiring type connection, with the control device (15) of the conditioning and/or heating plant (1) wherein the valve (16) is inserted, said control unit (24) being configured for receiving instructions from the control device (15) adapted to command the control unit (24) itself to execute the controlling process.

BRIEF DESCRIPTION OF THE DRAWINGS

Some embodiments and some aspects of the invention will be described in the following with reference to the attached drawings supplied only in an indicative and therefore non limiting way, wherein.

Figure 7:
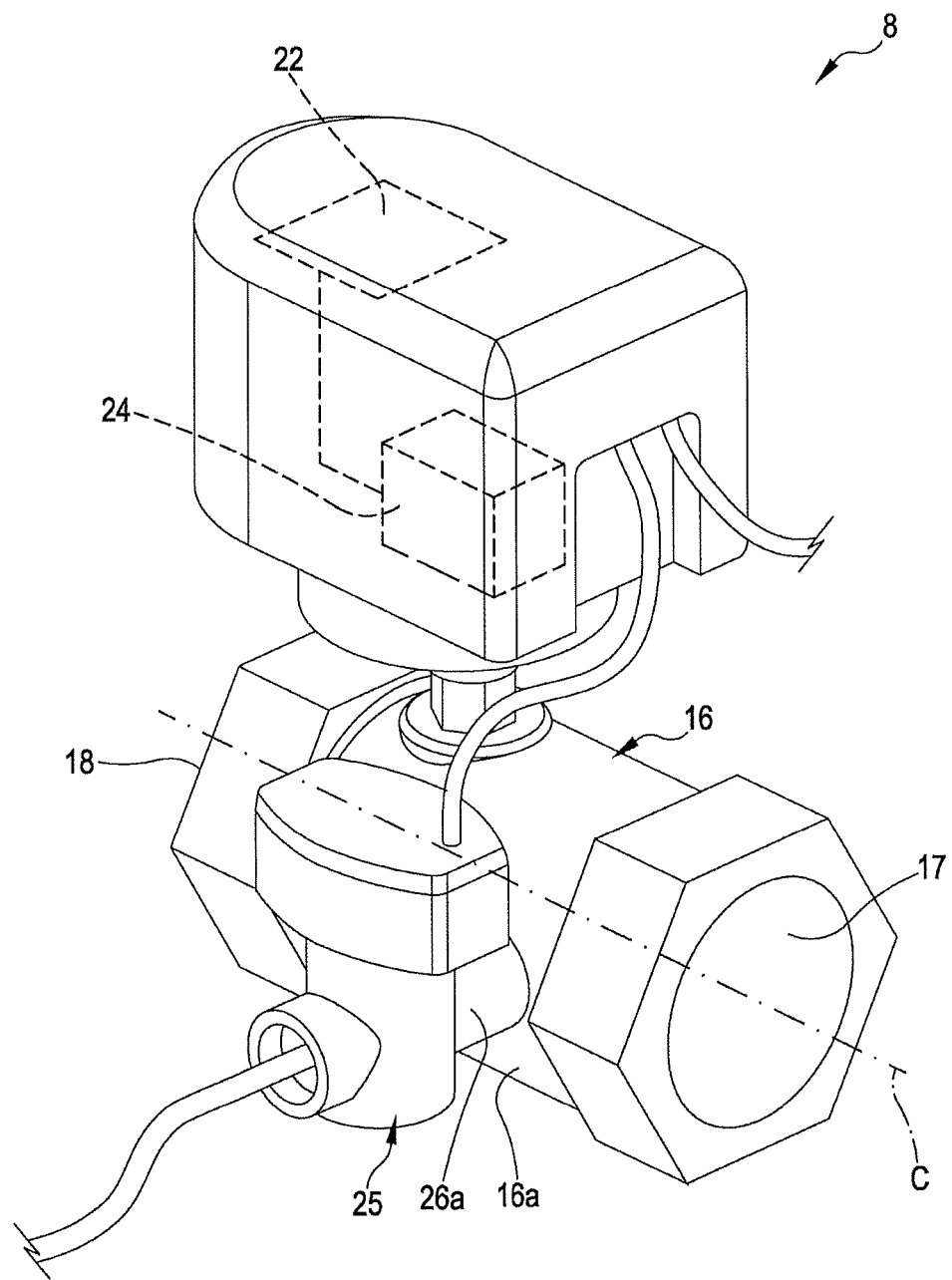
Figure 8:
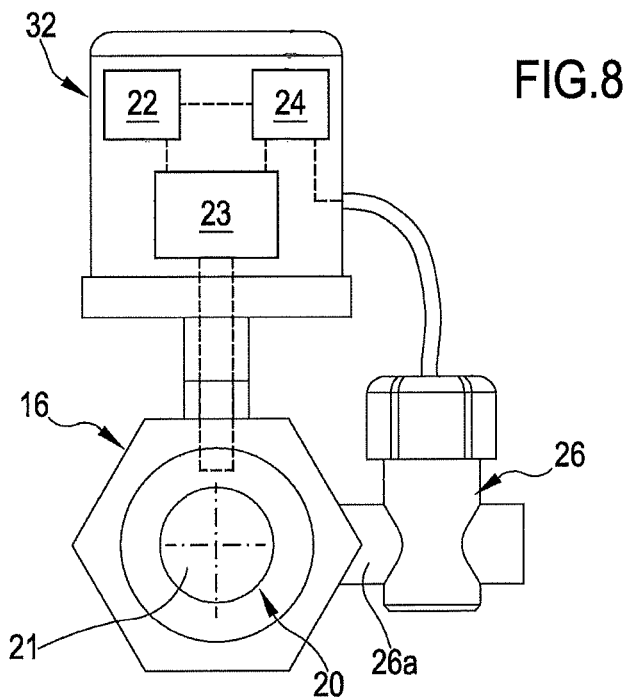
Figure 9:
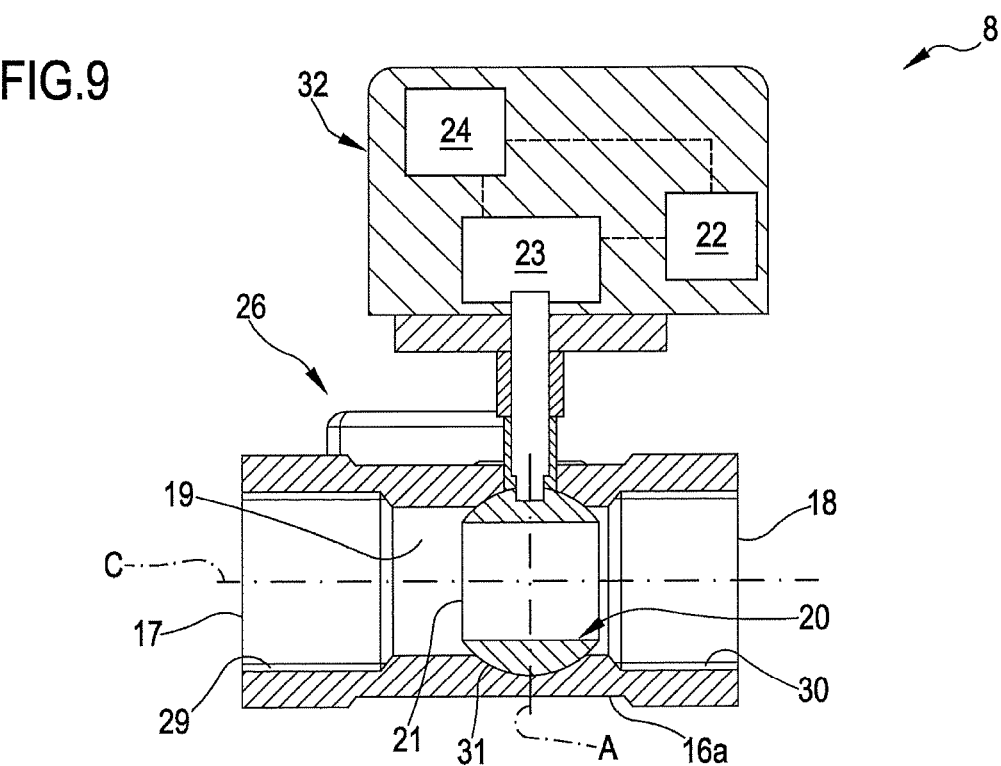

Figures from 2 to 6 are respective schematic views of embodiment variants of a branch of a plant according to the present invention;

FIG. 7 is a perspective view of a valve of a type configured for being hydraulically inserted in a channel of a conditioning and/or heating plant according to the present invention;

FIGS. 8 and 9 are respective cross-section views of a valve of a type configured for being hydraulically inserted in a channel of a conditioning and/or heating plant according to the present invention;

Figures from 10 to 13 are flow charts of a process for controlling a conditioning and/or heating plant according to the present invention.

DEFINITIONS AND MATERIALS

The figures could illustrate the object of the invention by not in scale representations; therefore, parts and components illustrated in the figures, regarding the object of the invention, could refer only to schematic representations.

The term "carrier fluid" or "thermal carrier" means a substance at the liquid or gas state capable of receiving, storing, transporting and releasing heat. For example, in a heating plant it is possible to use as a carrier fluid water, particularly hot water, or mixtures of hot water and glycol.

On the contrary, in a conditioning plant, it is possible to use as a carrier fluid refrigerating liquids of a natural type (for example ammonia and carbon dioxide) or artificial, or cold water or mixtures of water and glycol or other antifreezing substances.

The term "heat treatment central group" (indicated at 6 in the drawings) means a group comprising a heating unit 13 (for example a boiler unit, or a heat pump or solar panels system or another heating device) configured for heating a liquid and for distributing a hot liquid to suitable heat treatment units or users exploiting the heat for treating an environment. The heat treatment central group can comprise, in addition to or as an alternative, a refrigerating unit (also indicated at 13) configured for treating (cooling) a carrier fluid and for distributing the same to suitable heat treatment units such as for example inner air conditioning units. Moreover, the heat treatment central group comprises at least one pump indicated at 12 in the attached drawings.

The term "exchanged heat" (Q) in each heat exchange unit means the thermal energy exchanged by the carrier fluid with the supplied environment passing through a heat exchange unit. Particularly, the exchanged heat (Q) is given by the product between the temperature variation ($\Delta T$) in the carrier fluid when passing through the heat exchange unit, the mass (m) of the carrier fluid passing through the heat exchange unit and the specific heat (c) in the same carrier fluid. The exchanged heat (Q) in each heat exchange unit is therefore defined as:

$$Q = c \times m \times \Delta T$$

The heat can be measured in: Joule (J), Watt-hour (Wh), cal (calorie), British thermal unit (BTU) or kgp·m.

The term "thermal power" (P) exchanged in each heat exchange unit means the heat exchanged in the time unit. The thermal power for each heat exchange unit is given by the formula:

$$P = dQ/dt = c \times dm/dt \times \Delta T$$

from which, it is obtained:

$$P = c \times q \times \Delta T$$

wherein q is the mass flow of the carrier fluid passing through the heat exchange unit.

DETAILED DESCRIPTION

Conditioning and/or Heating Plant

With reference to the attached figures, 1 generally indicates a conditioning and/or heating plant for example useable both in the civilian field and in the industrial one and advantageously exploitable, in a non limiting way, for controlling and optimizing hydronic plants.

Figure 1:
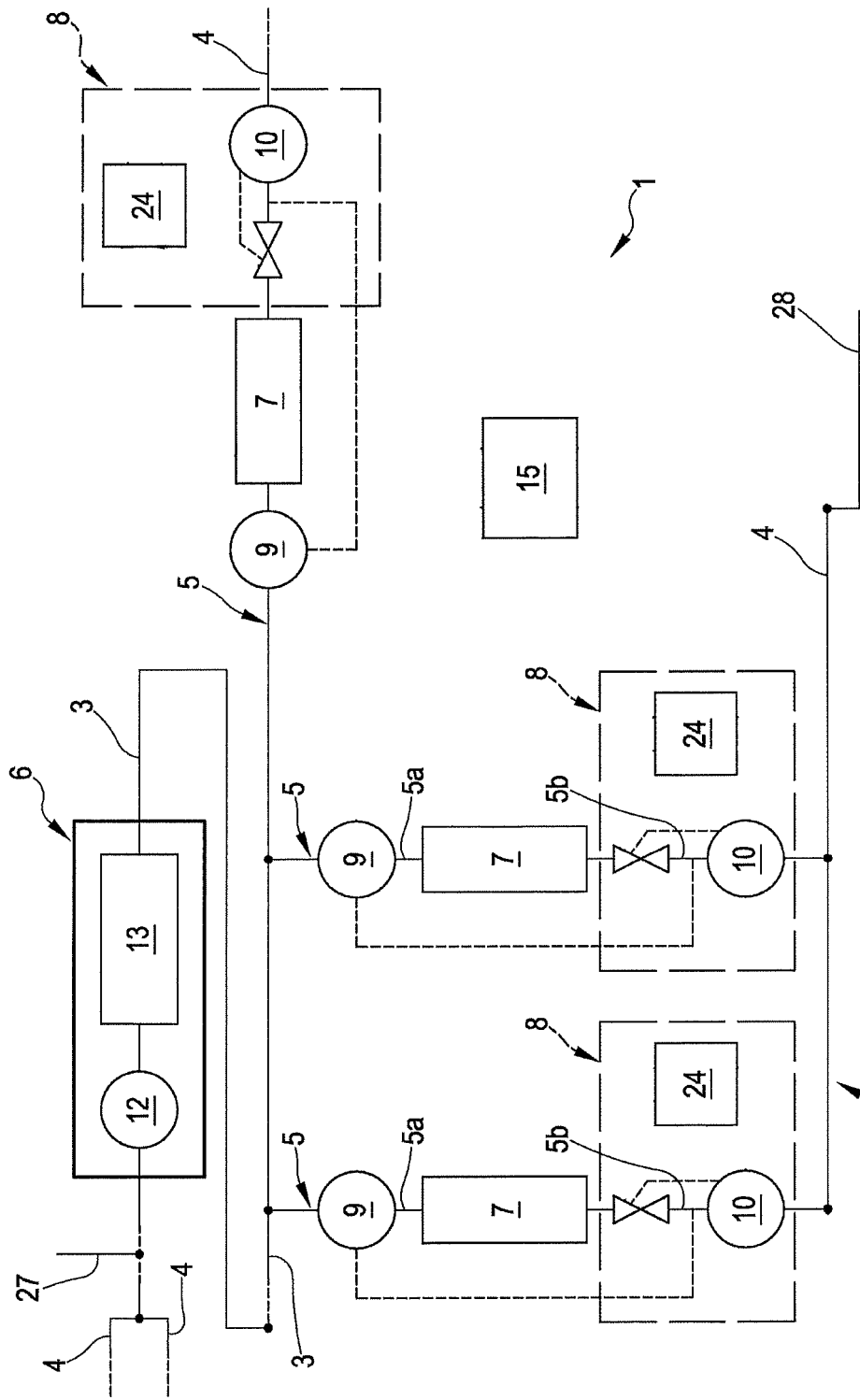
FIG. 1 is a non limiting schematic view of a conditioning and/or heating plant according to the present invention.

As it is for example visible in FIG. 1, the plant 1 comprises a circuit 2 for distributing a carrier fluid; the circuit 2 exhibits at least two main channels, in other words: a delivery line 3 for delivering the carrier fluid to a predetermined number of heat exchange users or units 7 and a return line 4 fluidically communicating with the delivery line 3 and arranged for receiving the carrier fluid downstream each of said units 7. As it is visible in FIG. 1, the distributing circuit comprises a plurality of circulating channels or distributing branches (in the following will be indicated by the term channels) 5 directly or indirectly connected to the delivery line 3 and return line 4 and configured for supplying respective environments to be conditioned and/or heated; indeed, as it will be better described in the following, each channel 5 is configured for supplying a predetermined number of heat exchange units 7 (for example a channel for each user).

Figure 6:
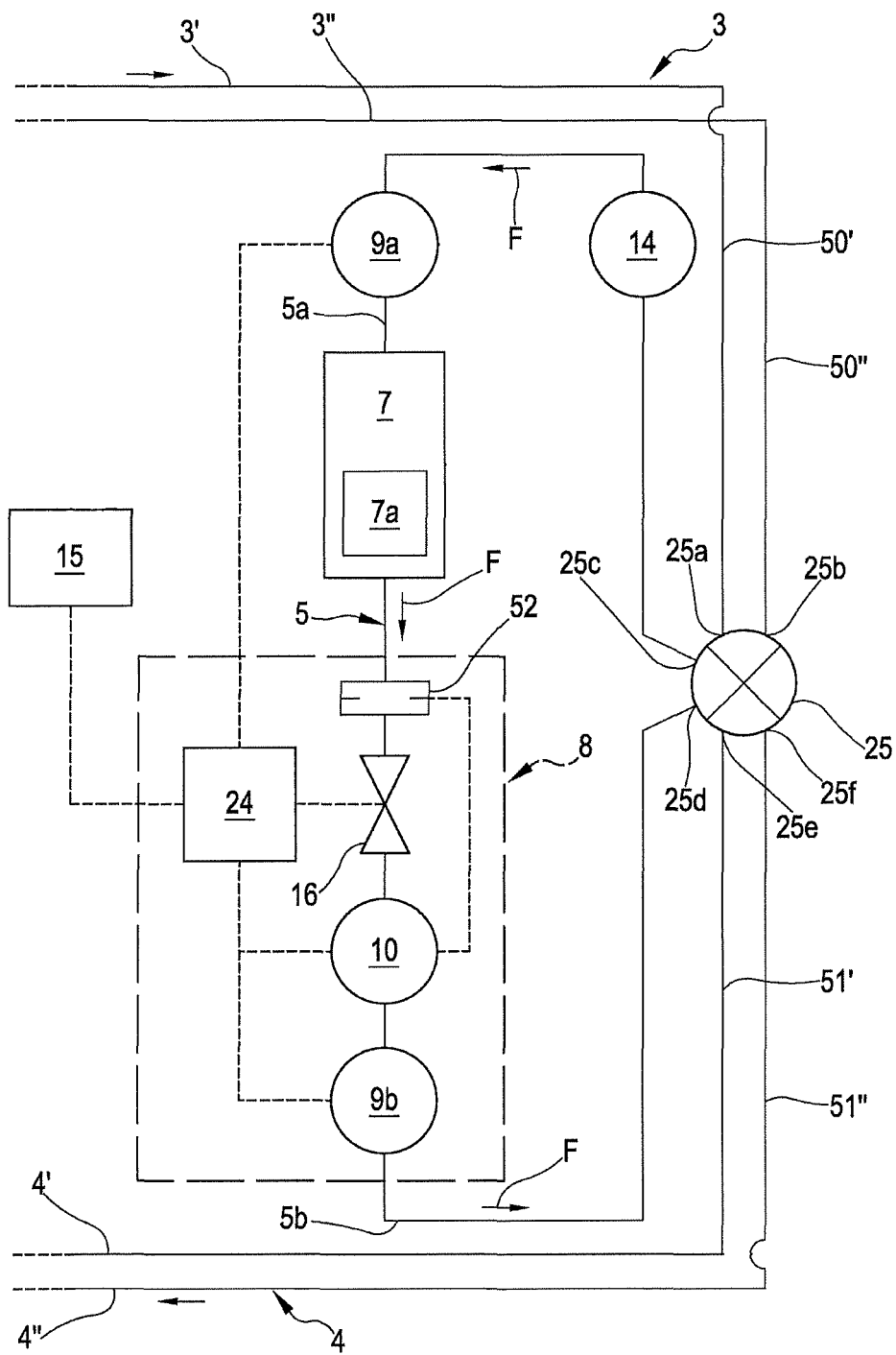

FIG. 1 illustrates a preferred but non limiting configuration of the invention, wherein each channel 5 is interposed between a delivery line and a return line and supplies a respective heat exchange unit 7; with such configuration, the channels 5 are placed parallel to each other and receive the fluid from the delivery line for releasing it to the return line after the passage of the fluid from the respective unit 7; in this configuration, it is possible to deliver to each unit 7 only one type of fluid: for example if the central group 6 comprises a heating (or refrigerating) unit 13, each of said channels 5 receives a heated (or cooled, respectively) fluid from the central group 6 and releases to the return line the fluid which now has been cooled (or heated, respectively) following the passage through the respective unit 7. FIG. 6 illustrates an embodiment variant wherein two delivery lines 3 (indicated at 3' and 3") are provided: for example, a delivery line 3' conveying a refrigerating fluid from a refrigerating unit 13 of the group 6 and a delivery line 3" from a heating unit 13 of the group 6. In this case, it is possible to selectively connect one or the other of the delivery lines to each of the heat treatment units. As shown in FIG. 6, indeed the circuit 2 comprises for each heat treatment unit 7, two intermediate channels 50' and 50" each connected to the respective one of said delivery lines 3' and 3" which respectively terminate at a first and second inlet ports 25a, 25b of a distributing valve 25 capable of connecting the channel 5 supplying each heat exchange unit 7 to one or the other of the two delivery lines 3; for this purpose, the valve 25 exhibits a first outlet port 25c connected to the channel 5. The channel 5, downstream the unit 7, is connected to a third inlet port 25d of the valve 25: the third inlet port 25d is selectively connectable to a second or third outlet port 25e, 25f of the valve 25. The valve 25 is configured for:

in a first configuration, selectively connecting the first inlet port 25a to the first outlet port 25c and the third inlet port 25d to the second outlet port 25e (in this first configuration, the second inlet port and third outlet port can be closed or directly connected to each other by bypassing the channel 5); while in a second configuration, selectively connecting the second inlet port 25b to the first outlet port 25c and the third inlet port 25d to the third outlet port 25f (in this second configuration, the first inlet port and second outlet port can be closed or directly connected to each other by bypassing the channel 5).

Thanks to the described structure, in the first configuration, the fluid from the delivery line 3' arrives into the intermediate channel 50' and is supplied to the channel 5 for being then released to a further intermediate channel 51' connected to the second outlet port 25e and to a line 4' of two return lines 4', 4". In the second configuration, the fluid from the delivery line 3" arrives in the intermediate channel 50' and is supplied to the channel 5 for being then released from a further intermediate channel 51" connected to the third outlet port 25f and to another one 4" of the two return lines 4', 4". The two return lines 4', 4" transport the respective fluids again (and along physically separated lines) to the respective refrigerating and heating units 13 of the group 6.

Despite what has been described, it is possible to provide more than two delivery lines and more than two return lines if the units 7 are configured for receiving at the same time or sequentially different type fluids. Moreover, it is not excluded the possibility of arranging one or more channels 5 with a configuration in series with each other wherein each channel 5 has a predetermined number of heat exchange users or units 7.

Further, FIG. 1 schematically shows a non limiting configuration of the invention wherein each return line is directly fluidically communicating with the delivery line 3 for defining a circuit 2 for distributing the carrier fluid of a closed-loop type wherein the carrier fluid (or different carrier fluids if more delivery lines and more return lines are used) is caused to recirculate inside the distributing circuit 2.

In a configuration of the plant 1 (FIG. 1), this latter can be provided with a supplying line 27, fluidically communicating with the delivery 3 and/or return lines 4, configured for enabling to add the carrier fluid to the circuit 2 and an outlet line 28, fluidically communicating with the delivery line 3 and/or return line 4, configured for enabling to release the carrier fluid from the circuit 2. On each of said supplying and outlet lines 27, 28, it is advantageously disposed a closure valve (this element is not illustrated in the attached figures), for example a ball valve or a simple "open and close" tap configured for opening and closing the lines 27 and 28 and therefore enabling to admit or discharge the carrier fluid from the circuit 2.

As it is visible in FIG. 1, the plant 1 comprises at least one heat treatment thermal group 6 comprising at least one pump 12 and at least one refrigerating or heating unit 13, placed on the delivery line 3 of the circuit 2 and configured for varying at least one between temperature and flow rate of the carrier fluid in the delivery line 3. The heat treatment group 6 is circuitally interposed between the delivery line/s 3 and return line/s 4 for supplying the delivery line or lines and receiving the returning fluid from the return lines. The group 6 comprises at least one pump 12 configured for imposing a hydraulic head on the fluid passing through the pump itself and therefore promoting the supply of the carrier fluid to the delivery line/s 3, 3', 3" and therefore to the channels 5. FIG. 1 schematically shows a configuration of the plant 1 exhibiting only one heat treatment central group 6; however, it is possible to provide a plurality of groups 6 serially or parallelly disposed on the delivery line 3 or directly active on the channel 5 (these conditions are not illustrated in the attached figures).

As hereinbefore briefly described, the circuit 2 comprises a plurality of channels 5; for each channel 5, the plant 1 comprises at least one exchange unit 7 configured for supplying a respective environment to be conditioned and/or heated. Each heat exchange unit (user) 7 can comprise at least one among:

a fan coil unit having at least one fan such as a heat exchange modulator 7a;

a UTA (air treatment unit) with at least one fan as heat exchange modulator 7a;

a radiator and/or convector such as a heat exchange unit 7a;

a heat exchanger, possibly having an adjustable heat exchange surface, such as a heat exchange modulator 7a.

As it is visible in Figures from 1 to 6 for example, the plant 1 comprises, for each of said channels 5, at least one flow-rate regulator 8 configured for managing the carrier fluid quantity (mass flow rate) passing from the respective channel 5. In a preferred but non limiting embodiment of the invention, the flow-rate regulator 8 is disposed on the channel 5 downstream—according to an advancement direction (circulation—see arrows F in Figures from 2 to 6) of the carrier fluid in the circuit 2—of the heat exchange unit 7 operating on the same channel 5.

More particularly, the flow-rate regulator 8 comprises a valve 16 having a valve body 16a exhibiting at least one inlet 17, one outlet 18 and a passage 19 which puts in fluid communication the inlet 17 with the outlet 18. The valve body 16a exhibits, at the inlet 17 and outlet 18 of the valve 16, respective connecting members 29, 30 (FIG. 9) adapted to enable to fix the valve 16 to the circuit 2. The connecting members 29, 30 can be for example threads (FIG. 9) or quick couplings or connections of another type.

The passage 19 exhibits a seat 31 adapted to receive an intercepting element 20 whose task consists of partially or completely intercepting the fluid passing through the valve and is therefore capable of acting as a flow regulator or even as an element for closing the passage 19; the intercepting element, cooperatively with the valve body 16a, defines a fluid passage opening 21 having a width varying as a function of positions taken by the intercepting element 20 in relation to the valve body 16a. The intercepting element 20 is configured for acting, along a predetermined operative stroke which comprises a predetermined number of operative positions distinctly and angularly or translatingly offset from each other. Therefore, the intercepting element 20 can be rotatively or translatingly moved. In the first case, the movement is performed by rotation according to a movement angle around a rotation axis A extending transversally with respect to a prevalent development axis C of the channel 19 (FIG. 9). In the second case, the movement can be executed according to a rectilinear direction (this configuration is not illustrated). By considering the case wherein the intercepting element 20 performs a rotative movement: for being capable of executing a rotative-type movement, the intercepting element 20 must exhibit an outer surface having a substantially spherical or cylindrical geometry, as it is possible to observe in FIG. 9.

Moreover, as schematically shown in FIGS. 8 and 9, the valve 16 comprises an actuating member 23 connected to the valve body 16a and active on the intercepting element 20 for moving this latter at least between a complete open position, wherein the passage opening 21 exhibits the maximum area (condition illustrated in FIG. 8, for example), to a closed position, wherein the passage opening 21 is closed. More particularly, the actuating member 23 can comprise an electric or mechanical type motor supported by the valve body 16a and engaged with the intercepting element 20.

Moreover, the flow-rate regulator 8 can comprise at least one position sensor 22 (Figures from 7 to 9) configured for determining the positions taken by the intercepting element 20, along a predetermined operative stroke in relation to the valve body 16a, and for transmitting a respective signal. In a non limiting embodiment of the invention, the intercepting element 20 is configured for taking a plurality of positions along said operative stroke, corresponding to different opening degrees of said passage opening 21: the position sensor 22 can for example comprise an encoder, a potentiometer, or another device configured for emitting a signal enabling to determine the position of the intercepting element along the operative stroke: for example, the position sensor 22 can be configured for emitting a signal at each step of a predetermined amount executed by the intercepting element 20 along the operative stroke, or for emitting a signal having a width or frequency which is a function of the position of the intercepting element along the operative stroke.

In a non limiting embodiment of the invention, the flow-rate regulator 8 further comprises a control unit 24 connected to the position sensor 22 and acting on the actuating member 23. The control unit 24 is configured for receiving the signal from the position sensor 22, for processing said signal for determining the relative position of the intercepting element 20 with respect to the valve body 16a. Moreover, the control unit 24 can be configured for commanding the actuating member 23, particularly for moving in a controlled way the intercepting element 20. Connecting by the control unit 24 to the sensor 22 and to the actuating member 23 enables the unit 24 to manage and control the movement of the intercepting element 20. Substantially, the control unit 24 comprises a microprocessor capable of receiving at the inlet the signal from 22, of determining therefore the real position of each intercepting element and of acting on the actuating member 23 as a function of such signal and of the desired position where the intercepting element 20 must be taken to.

In the embodiment example illustrated in Figures from 7 to 9, the sensor 22, actuating member 23 and control unit 24 are part of the valve 16 operating downstream each heat treatment unit 7 of the same channel 5 on which said valve 16 is active. De facto, the sensor 22, actuating member 23 and control unit 24 define a type of command head 32 (Figures from 7 to 9) stably supported by the valve body 16a, which is adapted to monitor and control the intercepting element 20.

As it is visible in FIG. 1, the plant 1 can comprise several sensors.

For example, for each channel 5, it can be provided at least one heat sensor 9 configured for detecting a measured value of a thermal parameter dependent on the temperature difference between a first section 5a of a channel 5 upstream said heat exchange unit 7 and a second section 5b of the same channel 5 downstream the same heat exchange unit 7. FIG. 1 illustrates a first configuration of the heat sensor 9 substantially comprising a single differential sensor connected to the first section 5a of a channel 5 upstream the heat exchange unit 7 and to the second section 5b of the same channel 5 downstream the same heat exchange unit 7: the differential sensor is configured for detecting the temperature difference between said first and said second sections 5a, 5b of each channel 5. The differential sensor 9 can be physically positioned upstream the exchange unit 7 as illustrated in FIG. 1, and exhibit a detecting line fluidically communicating on the channel 5 downstream the heat exchange unit 7. Alternatively, the sensor 9 can be supported by the flow-rate regulator 8, downstream the unit 7, and exhibit a detecting line fluidically communicating with a point of the channel 5 upstream the same unit 7.

Figure 2:
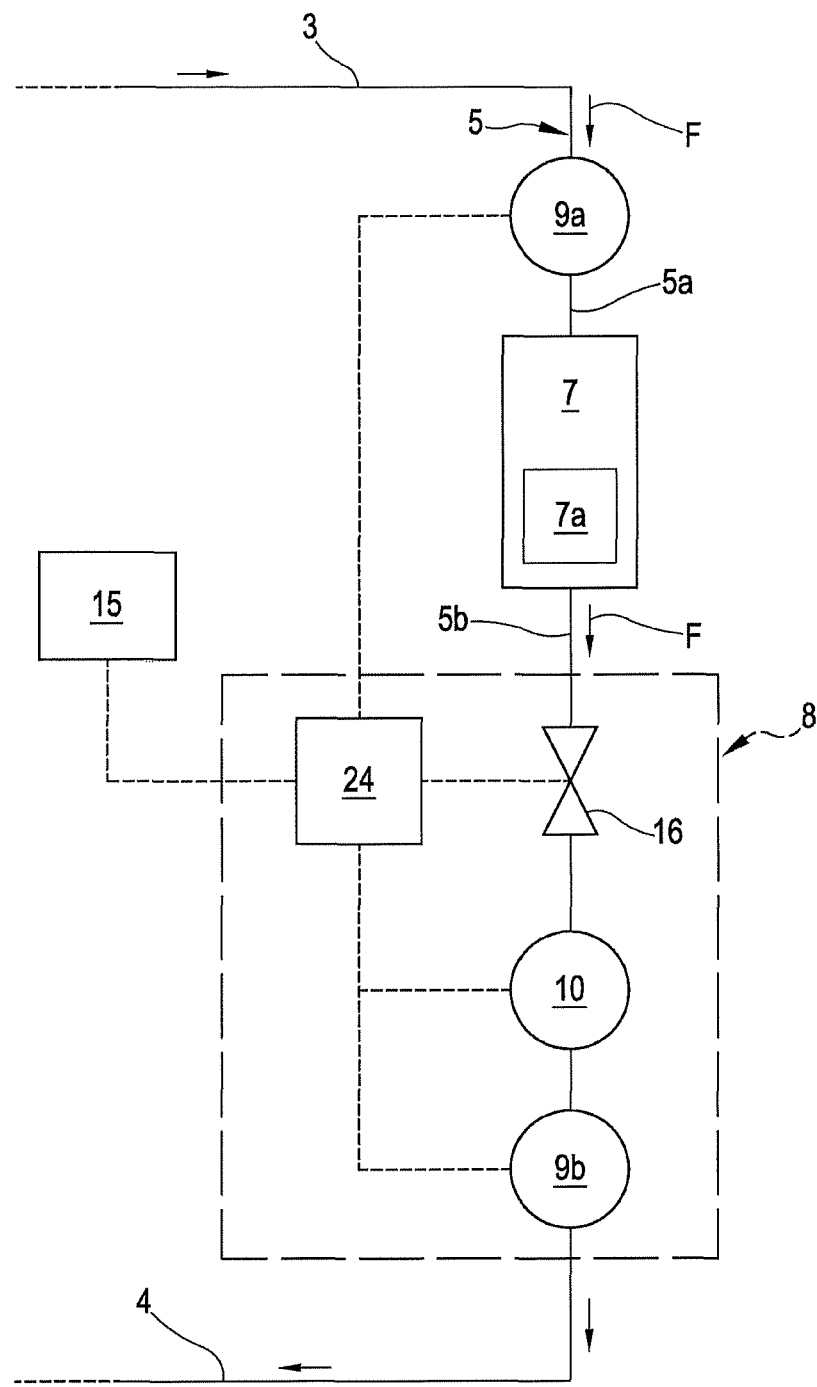

FIG. 2 illustrates a second embodiment wherein the heat sensor 9 comprises a first heat detector 9a configured for detecting the temperature in a first section 5a of a channel 5 upstream the heat exchange unit 7 and a second heat detector 9b configured for detecting the temperature in a second section 5b of the same channel 5 downstream the same heat exchange unit 7. In this second variant, the second detector 9b can be advantageously supported by the flow-rate regulator 8 and particularly by the valve 16.

Advantageously, the heat sensor 9 can be connected to the control unit 24 of the flow-rate regulator 8 which is configured for processing the signal received from said heat sensor and for calculating the temperature difference between the cited sections (the first and second sections 5a, 5b) upstream and downstream the heat exchange unit 7.

Figure 3:
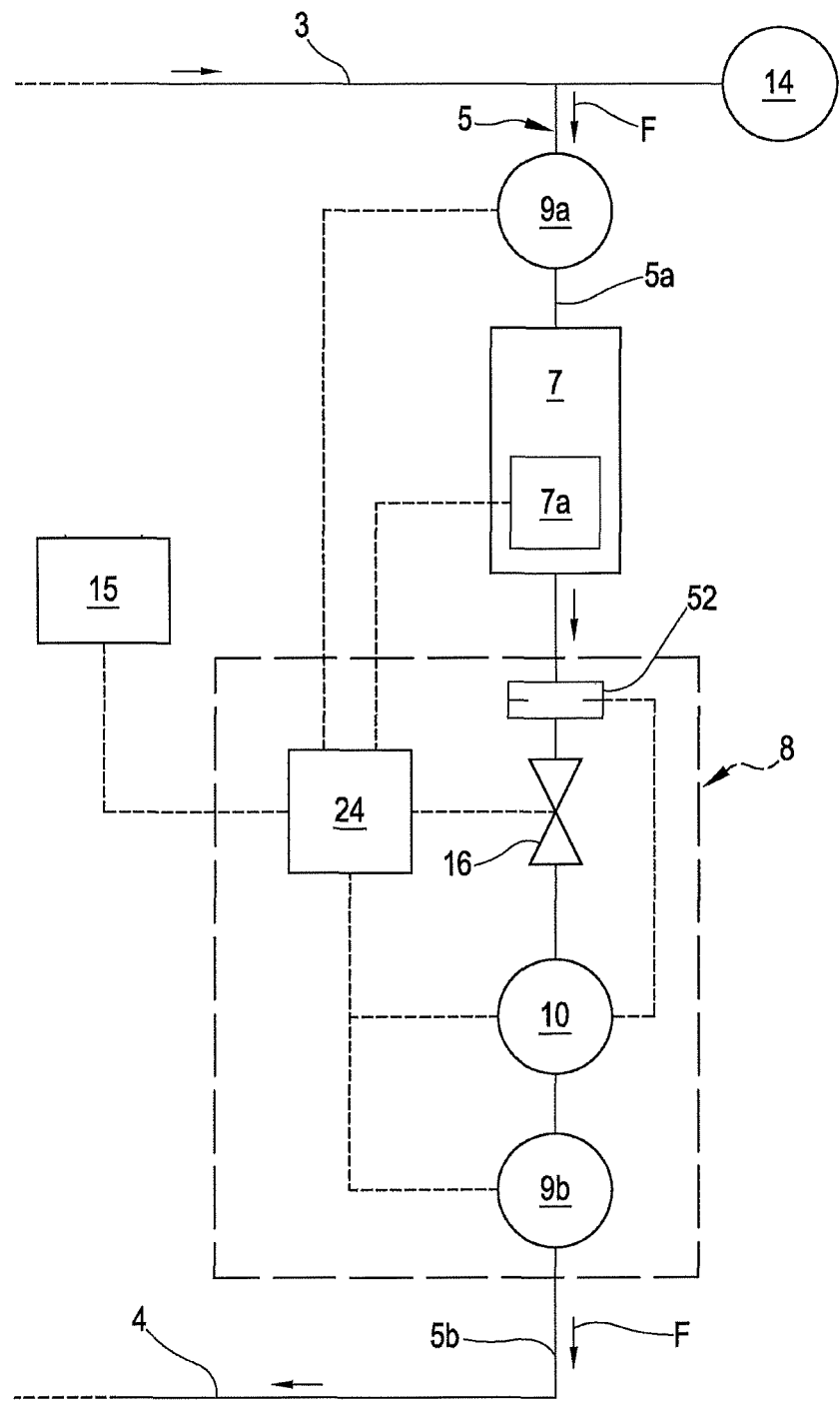

Further, the plant 1 can comprise, for each channel 5, at least one hydraulic sensor 10 configured for detecting (or enabling to determine by known formulas) the flow rate passing through each flow-rate regulator 8. In a configuration of the plant 1, the hydraulic sensor 10 can comprise a flow-meter (this case is shown in FIGS. 2 and 3, for example), directly supported by the flow-rate regulator 8, particularly directly by the valve 16, and configured for detecting the flow rate passing through the regulator 8.

Figure 4:
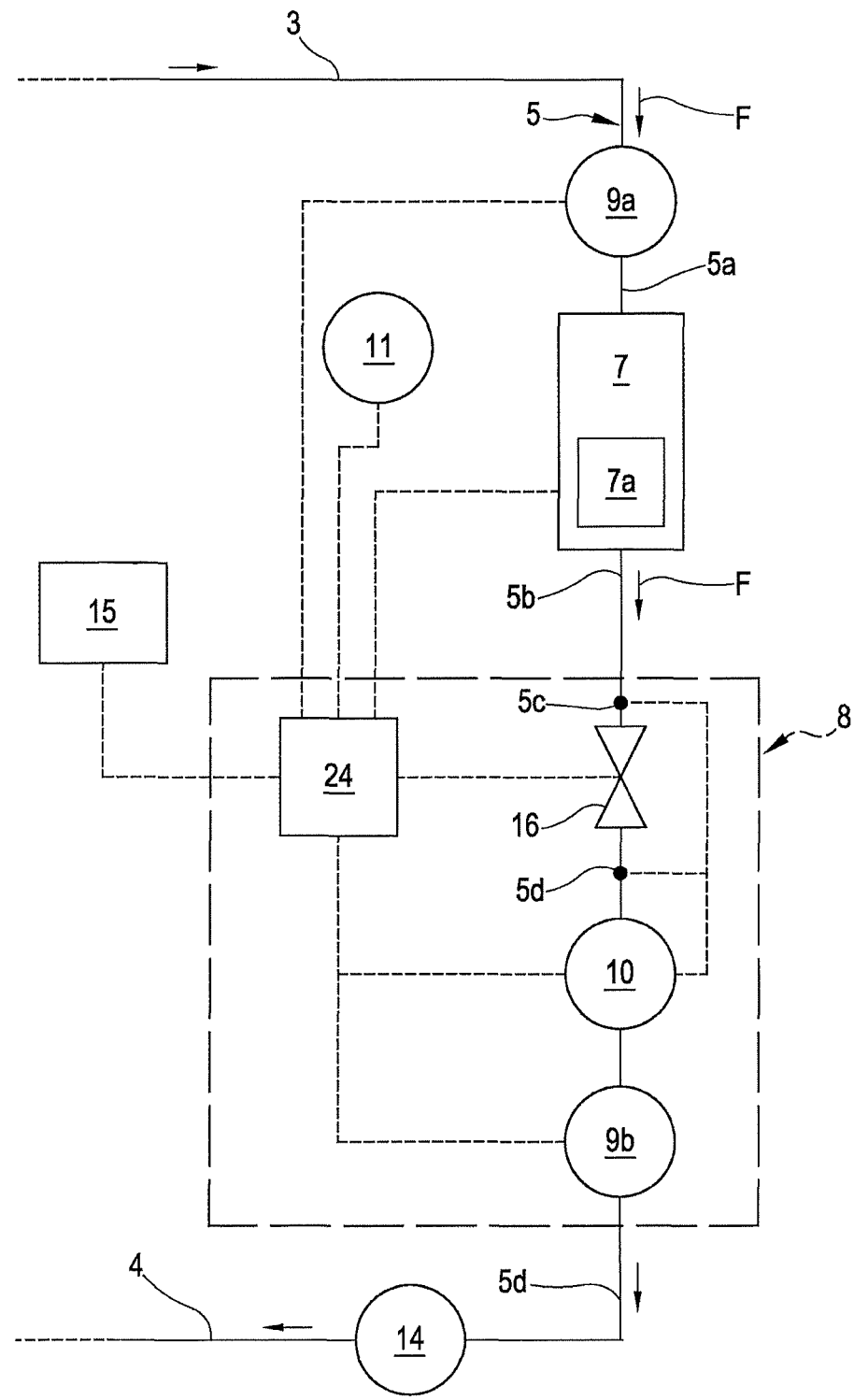

Alternatively, the hydraulic sensor 10 can comprise a sensor capable of measuring a pressure difference (or ratio) between a first section 5c of a channel 5 upstream said flow-rate regulator 8 and a second section 5*d* of the same channel 5 downstream the same flow-rate regulator 8 (this case is shown in FIG. 4): by knowing the position of the intercepting element and the characteristic curve of the mass flow rate/flow resistance of the valve 16, it is possible to obtain the flow rate from the measured value of the pressure difference. More particularly, the sensor 10 can for example measure a difference or ratio between the real pressure present in the section 5*c* and the pressure exiting in the section 5*d* by supplying an output signal proportional to the difference or ratio between the pressures in the two cited sections 5*c*, 5*d*. As it is visible in FIG. 4, the first section 5*c* of the channel 5 can be disposed downstream the heat treatment unit 7. Alternatively, the first section 5*c* of the hydraulic sensor 10 can coincide with the first section 5*a*, in other words can be disposed upstream the heat treatment unit 7. The second section 5*d* is, for example, placed immediately downstream in other words on the valve 16 and is directly connected to the passage 19*a* of the channel 19 of the valve 16. The first and the second sections 5*c*, 5*d* could be both placed on the valve body of the valve 16 upstream and downstream the intercepting element 20.

Figure 5:
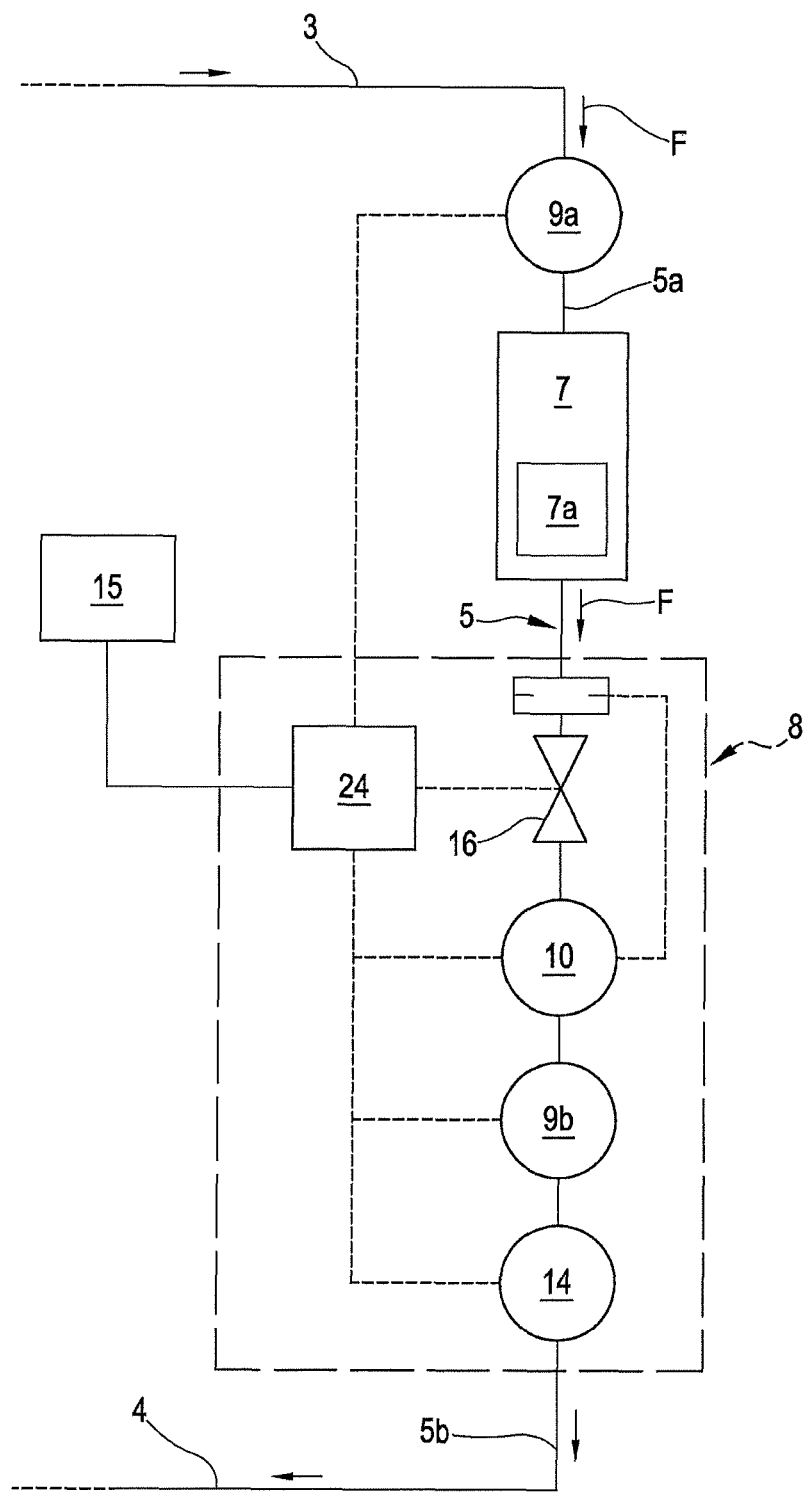

In a further alternative, the hydraulic sensor 10 can comprise a sensor capable of measuring the pressure in a section of a channel 5 immediately upstream and in a section immediately downstream a calibrated orifice 52 (this case is illustrated in FIGS. 5 and 6), in other words the differential pressure between the two points immediately upstream and downstream the calibrated orifice 52: the calibrated orifice is preferably placed upstream the flow-rate regulator so that is not subjected to an interference; by knowing the characteristics of the mass flow rate/loss resistance of the orifice, it is possible to determine the mass flow through the same.

De facto, the sensor 10 can, in all the above described cases, comprise a pressure differential sensor 26 which receives, at the inlet, a first and second pressure signals and generates, at the outlet, a differential signal by which the flow rate can be calculated.

As an alternative to the use of a differential sensor, it is possible to have a configuration in which the sensor 10 comprises a first detector and second detector fluidically communicating with the respective above described sections of the same channel 5.

Advantageously, also the hydraulic sensor 10 is connected to the control unit 24 of the flow-rate regulator 8; the control unit 24 is configured for receiving the signal from said hydraulic sensor 10 and calculating the mass flow passing from the same. For example, the control unit 24 is configured for determining the mass flow real value passing through the regulator 8 as a difference between the values of the pressure parameter, measured in the first and second sections 5*c* and 5*b* by the sensor 10.

Further, as it is visible in FIG. 5, the plant can comprise, for each channel 5, a third sensor 14 configured for generating a signal and supplying it to the control unit 24; the control unit 24 is configured for receiving said signal, processing and determining a chemical-physical parameter of the carrier fluid, comprising at least one among:
the pH of the carrier fluid,
the conductivity of the carrier fluid,
the concentration of at least one predetermined substance in the carrier fluid.

FIG. 5 schematically shows a configuration of the plant 1 wherein the third sensor 14 is, in a non limiting way, operatively active downstream the heat exchange unit 7; particularly it is possible to equip the flow-rate regulator 8, particularly the valve 6, with said third sensor 14. However, it is not excluded (see FIGS. 2, 3, 4, 6) the possibility of disposing the third sensor 14 in any point of each channel 5, for example upstream the heat exchange unit 7. In a further embodiment variant, the plant 1 can provide only one sensor 14 operatively active on the delivery line 3 or on the return line 4.

Moreover, as illustrated in FIG. 4, the plant 1 can comprise an environment temperature sensor 11 (see FIG. 4) destined to operate at each of the environment supplied by the heat exchange unit 7. Advantageously, the sensor 11 can be connected to the control unit 24 of the flow-rate regulator 8; the control unit 24 can in this case be configured for receiving the signal from the sensor 11 and determining the environment temperature at the heat treatment unit 7.

Further, the plant 1 can comprise, for each of said channels 5, at least one partial or total closure member (this configuration is not illustrated in the attached figures). The closure members can be positioned at the beginning or at the end of each channel 5 respectively upstream or downstream each element (sensors, heat treatment units, regulators) active on the same channel 5. More particularly, each closure member can comprise an on/off valve which interrupts or enables the supply of each channel 5: in this way, the closure members can exclude or not a channel 5 and for example the thermal treatment of an environment.

As it is visible in FIG. 1 for example, the plant 1 comprises a control device 15 connected at least to the above described sensors 9 and 10 of each channel 5 and active on each flow-rate regulator 8 and said heat treatment central group 6. Such control device 15 is configured for receiving the values of the parameters measured by the above described sensors and for executing the described and/or claimed controlling process (and possibly the optimizing cycle). For example, the control device 15 can comprise one or more microprocessor units having associated memories capable of storing a code which, when executed by the one or more microprocessor units, makes the control device 15 capable of executing the controlling process described and/or claimed in the following. Alternatively, the control device can comprise an analog circuit configured for executing the controlling process described and/or claimed in the following.

Controlling Process

The controlling process is described hereinbelow by exemplifyingly assuming that such process is executed by the device 15. Alternatively, the controlling process can be managed by another control unit remote from the plant 1 or by the control unit 24 supported by the one or more valves 24. In a further alternative, it is possible to provide that the controlling process is performed partially by the device 15 and partially by the unit 24 in the valve 16.

Figure 11:
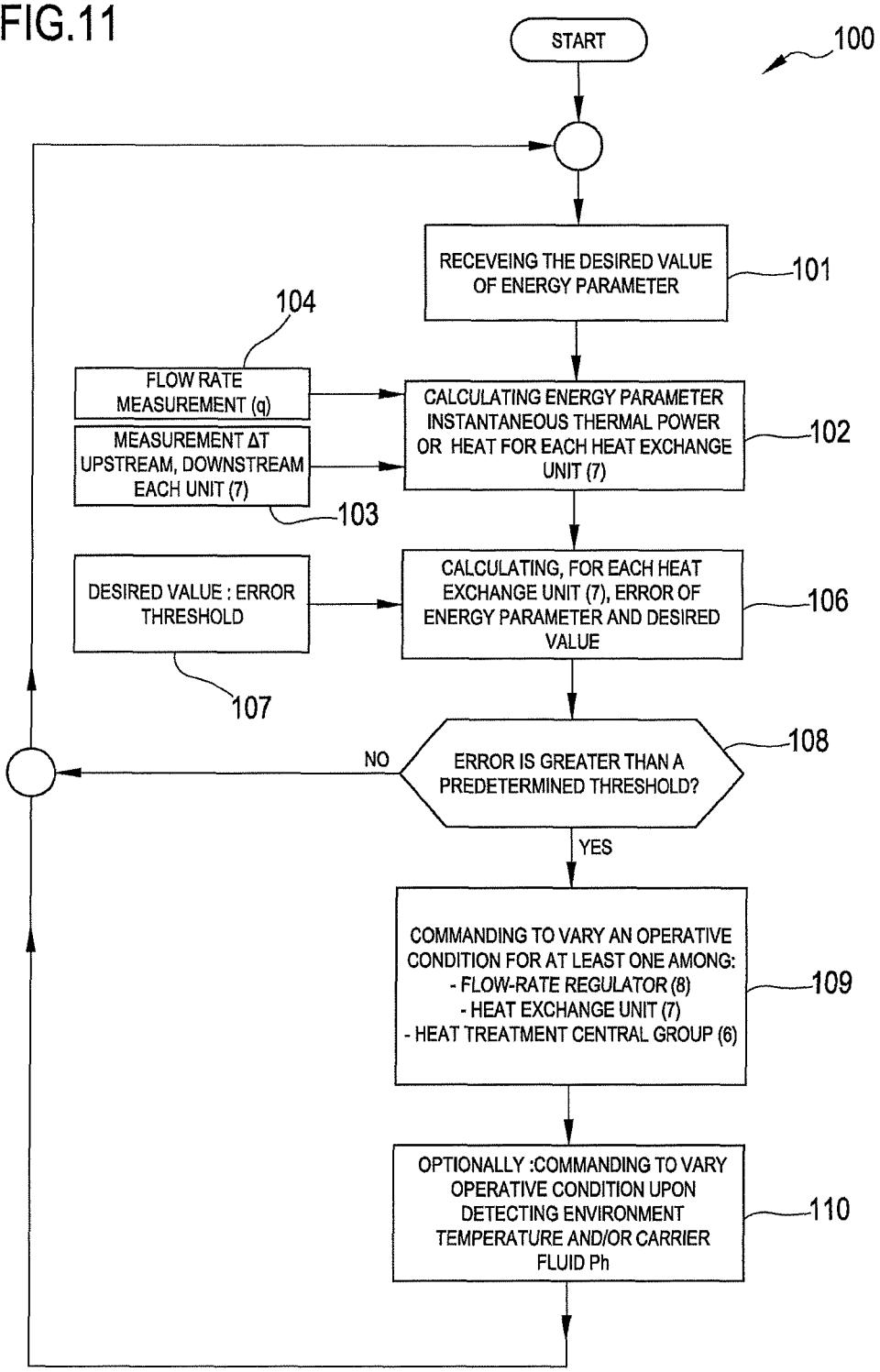

In a first example illustrated in FIG. 11, the control device 15 is configured for enabling to start the plant and particularly:
commanding the heat treatment central group 6 to impose initial values at a temperature, hydraulic head and/or overall flow rate of the carrier fluid in the delivery line 3,
commanding each flow-rate regulator 8 to impose a respective initial value of the energy parameter associated to each heat exchange unit 7 in other words the flow rate in each channel 5.

Therefore, the control device 15 is configured for executing a controlling process 100 comprising at least the steps of:
receiving (step 101) at least one desired value of an energy parameter comprising one among:

the thermal power released from the carrier fluid passing through each heat exchange unit 7, the thermal power received by the carrier fluid passing through each heat treatment unit 7, the heat released from the carrier fluid in a predetermined time interval during the passage through each heat exchange unit 7, the heat absorbed by the carrier fluid in a predetermined time interval during the passage through each heat exchange unit 7, calculating, for each heat exchange unit 7, an effective value of said energy parameter as a function of the measured value of the thermal parameter and of the measured value of the flow parameter (step 103).

The step of calculating, for each heat exchange unit 7, an effective value of said energy parameter comprises at least the following sub-steps:

receiving from the thermal sensor 9 the temperatures detected in the first section 5a and in the second section 5b of each channel 5, and calculating by them a corresponding detected temperature difference, or directly the temperature difference detected between said first and said second sections 5a, 5b of each channel 5 (step 103 in FIG. 11), receiving from the hydraulic sensor 10 directly the detected flow rate passing through a flow-rate regulator 8, or the detected pressure difference and the process providing to calculate the detected flow rate passing through the flow-rate regulator 8 based on such detected pressure difference (step 104 in FIG. 11), calculating the effective value of the energy parameter as a function of the detected flow rate passing through the flow-rate regulator 8 and the detected temperature difference (step 102 in FIG. 11).

More particularly, the energy parameter is referred to the released or absorbed heat which is calculated by the control device 15 by means of the following general formula:

$$Q = c \times m \times \Delta T$$

wherein Q is the heat, c the specific heat of the carrier fluid, m the mass of the carrier fluid while $\Delta T$ is the temperature difference detected by the sensor 9 in the sections 5a and 5b of a channel 5.

Alternatively, the energy parameter can refer to the exchanged (released or absorbed) thermal power in each channel 5, which is calculated by the control device 15 by means of the following general formula:

$$P = c \times q \times \Delta T$$

wherein P is the thermal power, c the specific heat of the carrier fluid, q the mass flow of the carrier fluid, measured by the sensor 10, while $\Delta T$ is the temperature difference measured by the sensor 9 in the sections 5a and 5b of a channel 5.

After the step of calculating the energy parameter, the control device is configured for executing a step of comparing, for each heat exchange unit 7, the desired value of the energy parameter with the effective value of the same energy parameter (comparison of the values for each channel 5; step 106).

The control device 15, in an initial step of the process, is therefore configured, for each heat exchange unit 7, for comparing the desired value of the energy parameter and the effective value of the same energy parameter and in turn for verifying, for each heat exchange unit 7, if the effective value of the energy parameter deviates more than a predetermined threshold from the desired value of the same energy parameter (the reception of the desired value is represented by the block 107 in FIG. 11).

If, following the comparison step, the control unit 15 detects that, for at least one heat exchange unit 7, the effective value of the energy parameter deviates more than a predetermined threshold from the desired value of the same energy parameter (step 108), the same unit will be configured for commanding a variation of an operative condition (step 109) of at least one among:

the flow-rate regulator 8 present on the channel 5 of the heat exchange unit 7, said heat exchange unit 7, the heat treatment central group 6.

Particularly, if, following the comparison step, the control device 15 detects that:

for at least one heat exchange unit 7, the effective value of the energy parameter will deviate more than a predetermined threshold from the desired value of the same energy parameter, and for at least one heat exchange unit 7, the effective value of the energy parameter will fall inside a predetermined threshold from the desired value of the same energy parameter, the same control device 15 is only configured for commanding a variation of an operative condition of at least one between: the flow-rate regulator 8, the heat exchange unit 7.

De facto, if the control device 15 detects an erroneous configuration (a value of the energy parameter is outside the threshold) of only one channel 5 of the circuit 2, the control device 15 itself can be configured for acting only by the flow-rate regulator 8 or by the heat exchange unit 7 itself; in such condition, indeed the variation of the parameters of the central group 6 can deviate from the desired energy values of all of the remaining channels 5 of the circuit 2.

Viceversa, if the control device 15 detects (after the comparison step) that for all the or for the majority of the heat exchange units 7, the effective value of the energy parameter deviates more than a predetermined threshold from the desired value of the same energy parameter, the control device 15 can be configured for executing, by the command step, a variation of an operative condition only of the heat treatment central group 6, by for example altering the hydraulic head imposed to the pump 12 of the group 6, or by varying the temperature of the carrier fluid.

If the command step provides to vary the flow rate in one or more channels 5, the control device 15 is configured for executing the command step by a variation of an operative condition which comprises varying the position of the intercepting and/or regulating element 20 of the valve 16 for reducing a deviation between an effective value of the energy parameter and a desired value of the energy parameter itself. Advantageously, the control device 15 can be connected to the position sensor 22 of the flow-rate regulator 8 and to the actuator 23: the device 15 is configured, in this case, for acting on the actuator for displacing the intercepting element 20 in relation to the channel 19 of the valve and for monitoring the position by the sensor 22.

Instead, if the step of commanding a variation of an operative condition comprises commanding the heat exchange unit 7, the control device 15—connected to each unit 7—is configured for acting on the heat exchange modulator 7a for reducing a deviation between the effective value of the energy parameter and a desired value of the same energy parameter. For example, in case of a fan coil unit, wherein the heat exchange modulator comprises at least one fan, the control device 15 is configured for commanding a variation of the angular speed of said fan.

Instead, if the variation of an operative condition is executed on the central group 6, the control device 15 is configured for:

commanding the delivery pump 12 to vary a hydraulic head generated by the pump, for example by varying the number of revolutions of the pump in the typical case of pumps having rotative elements, and therefore altering the pressure condition on the delivery line 3 for reducing a deviation between the effective value of the energy parameter and the desired value of the same energy parameter in relation to a predetermined number of said heat exchange units 7, commanding at least one between the heating and/or refrigerating units 13 to vary the temperature of the carrier fluid in the delivery line 3 and reducing a deviation between the effective value of the energy parameter and the desired value of the same energy parameter in relation to a predetermined number of said heat exchange units 7.

As hereinbefore described, the plant 1 can further comprise at least one temperature sensor 11; the control device 15 can be advantageously connected to said sensor 11 and configured for:

verifying if, for each of said environments, a desired environment temperature value deviates more than a predetermined threshold from the value detected by the environment temperature sensor, and if from said verification, it results that the desired environment temperature value deviates more than a predetermined threshold from the value detected by the environment temperature sensor, commanding to vary an operative condition of at least one among:
the flow-rate regulator 8 present on the channel of the heat exchange unit 7,
said heat exchange unit 7,
optionally, the heat treatment central group 6.

Moreover, as hereinbefore described, the plant 1 can comprise a third sensor 14 configured for monitoring the carrier fluid and for generating a signal associated to a physical-chemical parameter of the fluid; advantageously, the control device 15 can be connected to said sensor 14 and configured for processing the signal for detecting at least one among: the pH of the carrier fluid, the conductivity of the carrier fluid, the concentration of at least one predetermined substance in the carrier fluid.

Therefore, the control device 15 is configured for further executing the following steps:

receiving from said third sensor 14 a measured value of said chemical-physical parameter, comparing said measured value with at least one desired value of the chemical-physical parameter, verifying if the effective value of the chemical-physical parameter deviates more than a predetermined threshold from the desired value of the same parameter;

optionally wherein—if after said comparison step, it results that the effective value of the chemical-physical parameter deviates more than a predetermined threshold from the desired value of the same parameter—the control device 15 is configured for emitting an alarm signal and/or commanding a variation of an operative condition of at least one among:
one or more flow-rate regulators 8,
one or more heat exchange units 7,
optionally, the heat treatment central group 6.

The steps of varying the operative condition following the detection of an environment temperature and/or a chemical-physical characteristic of the carrier fluid are schematically represented by the block 110 in FIG. 11, and are optional.

In a preferred configuration of the invention, the control device 15 is connected to all the measuring elements (sensors) and actuating elements (the flow-rate regulator 8 in each channel and the heat treatment central group 6) of the plant 1: therefore the control device 15 is configured for calculating the real energy parameter in each channel 5 and, by the actuating elements, for varying the value of the real energy parameter in each of said channels and in the delivery and return lines for causing said real value to not deviate from the desired value more than a determined threshold.

In a preferred further configuration of the invention, the control device 15 is directly connected only to the heat treatment central unit 6, at the same time it is connected to said sensors (elements 9, 10, 11, 14 and 22) by the control unit 24 of the flow-rate regulator 8. De facto, as illustrated in FIGS. 2 and 3 for example, the control unit 24 of the flow-rate regulator 8 is directly connected to: the sensors 9 and 10 (particularly to the sensors 9a, 9b and 10), the position sensors 22 and the actuator 23, the valve 16, and optionally to the heat treatment unit 7, particularly to the modulator 7a of the unit 7.

In such configuration, the control unit 24 can be configured for receiving all the signals from the sensors and for calculating the temperature difference $\Delta T$ between the sections 5a, 5b, for calculating the flow rate passing through the channel 5, defining the position of the sensor 22. The control unit 24 communicatively connected to the device 15, can be configured for communicating, by a wireless or wiring type connection, to the control device 15 of the conditioning and/or heating plant 1, wherein the valve 16 is inserted; the control unit 24 can be configured for example for sending data to the device 15 which will execute then the effective above described comparison steps. However, it is not excluded the possibility of performing the comparison steps directly by the control unit 24 of one or of each flow-rate regulator 8. The command step is then given to the control device 15, which can:

deliver the command signal directly to the flow-rate regulator 8 or to the heat exchange unit or to the central unit 6, and/or deliver the command signal to the control unit 24 of one or more flow-rate regulators 8, which will provide to transfer the command to the actuator 23 or heat exchange unit 7 or central unit 6.

The attached figures illustrate a preferred but non limiting configuration of the invention wherein all the commands and measurements of a channel 5 go directly from the control unit 24 of the regulator 8 active on this channel 5 to the control device 15: the control unit 24 is in this case configured for receiving instructions from the control device 15 adapted to command the control unit 24 itself to execute the controlling process.

Also if the plant 1 were provided with the environment temperature sensor 11 and third sensor 14, these could be directly connected to the control unit 24 of the channel 5 which said sensors 11 and 14 are operative on; the signals are directly delivered to said unit 24 which could:

calculate the real values of the respective parameters and deliver them to the control device 15;

calculate the real values of the respective parameters, perform the comparison with desired values of the same parameters and deliver the result of the comparison to the control device 15.

After the comparison step, the control device 15 is configured for delivering the command signal directly to the unit 24 which is configured for transferring the command to the actuator 23 and/or heat treatment unit 7.

In an embodiment variant, the control device 15 can be integrated in a control unit 24 of a flow-rate regulator 8; with such configuration, the regulator 8 itself can be configured for executing the steps of receiving the real values from the sensors, calculating, for each heat exchange unit 7, an effective value of the energy parameter, comparing the desired energy parameter with the measured one and possibly commanding to vary an operative condition of at least one among: one or more flow-rate regulators 8, one or more heat exchange units 7, the heat treatment central group 6.

Therefore, the control device 15 is in this case configured for executing the above described controlling process for ensuring the set design performance with the lowest energy consumption. The controlling process can be cyclically executed, for example at predetermined time intervals, or can be continuously executed so that each operative condition variation introduced to the circuit 2—for example closing one or more channels 5—which could cause a deviation from the desired design conditions, can be offset and controlled by the control device 15.

Optimization Cycle

The invention provides also that the controlling process can comprise the execution of a hydraulic optimization cycle, for example also managed by the control device 15 together with or independently from the above described controlling process. As an alternative, only a controlling process comprising the hydraulic optimization cycle can be provided.

In a further alternative, the hydraulic optimization cycle can be provided as part of a process for controlling standard plants, for example of the type described in document WO2010074921A2, because the optimization cycle enables anyway to have important benefits by causing the plant to operate at conditions of minimum energy consumption enabling at the same time to meet determined set points for the different users that the plant itself is destined to supply.

Figure 10:
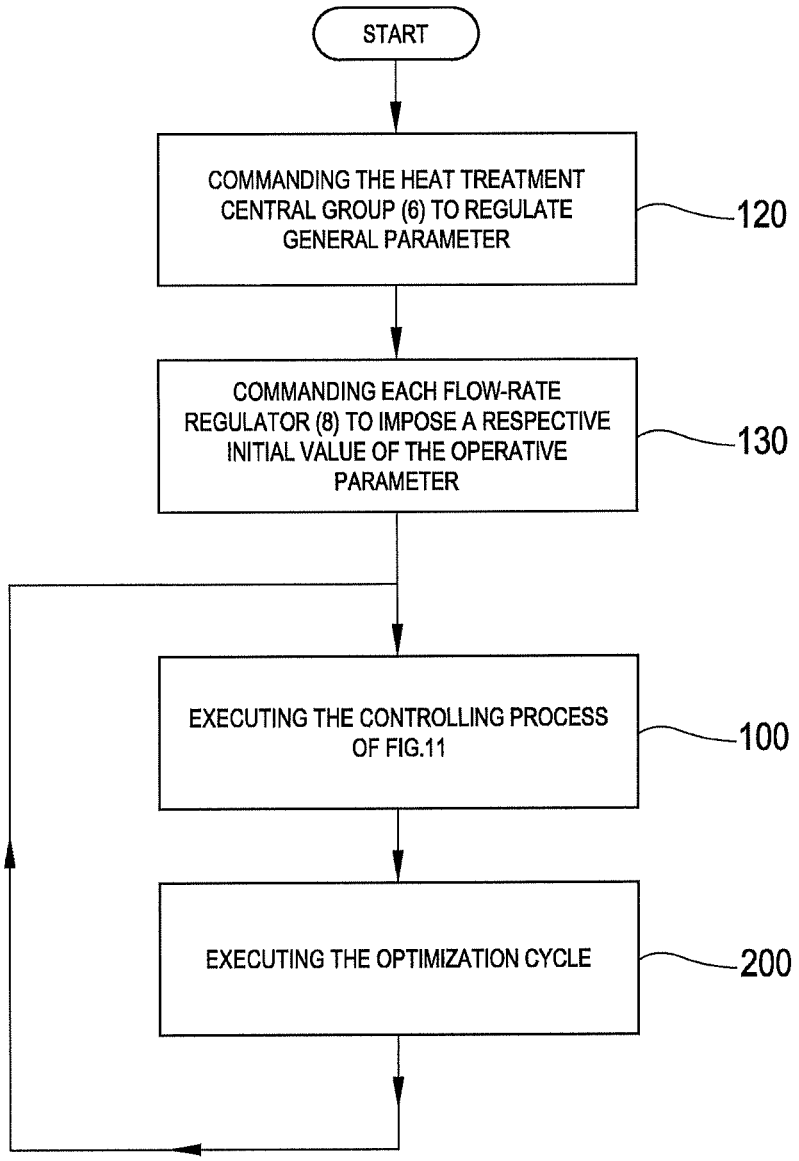

As shown in FIG. 10, the controlling process can provide to command the central group 6 (step 120) to regulate (to set, based on an initial value, for example) at least one general parameter selected among:
- the hydraulic head imposed to the carrier fluid passing through the central group,
- the heating imposed to the carrier fluid passing through the central group,
- the cooling imposed to the carrier fluid passing through the central group,
- the flow rate imposed to the carrier fluid on the delivery line.

The process can also provide to command the flow-rate regulator on each of said channels (step 130) to impose a respective desired value of an operative parameter (which can correspond to the cited energy parameter, for example, but as it will be explained, can be for example also a different parameter such as the mass flow in each channel) in relation to each channel wherein a respective flow-rate regulator is present.

More specifically, the operative parameter comprises the cited energy parameter (which can be calculated thanks to the detections of the hydraulic sensor 10 and heat sensor 9) or a flow parameter detectable by the above described hydraulic sensor 10 in each channel 5. The flow parameter can be for example selected among:
- the flow rate passing through each flow-rate regulator 8,
- the pressure difference between a first section 5c of the channel 5 upstream each flow-rate regulator 8 and a second section 5d of the same channel 5 downstream the same flow-rate regulator 8,
- the pressure difference between a first section of a channel 5 upstream a calibrated orifice and a second section of the same channel 5 placed downstream the calibrated orifice, the calibrated orifice being placed on each channel preferably upstream each of said flow-rate regulator.

In other words, upstream or after the optimization cycle, it can be provided that the process comprises a step wherein the plant acts on the flow-rate regulator for imposing a desired flow rate along each channel 5 or for imposing that each heat exchange unit supplies or absorbs a determined thermal power (or a heat quantity in a certain time interval). As hereinbefore mentioned, the control unit 24 or device 15 can execute these controlling steps by commanding the flow-rate regulator so that the flow rate in each channel/thermal power for each exchange unit complies with values set by the designer, enabling in this way, both at the installation and under any other conditions, to set the flow rates/powers (in other words the operative parameter) in different branches of the plant, consistent with the setpoints defined by the designer.

Figure 12:
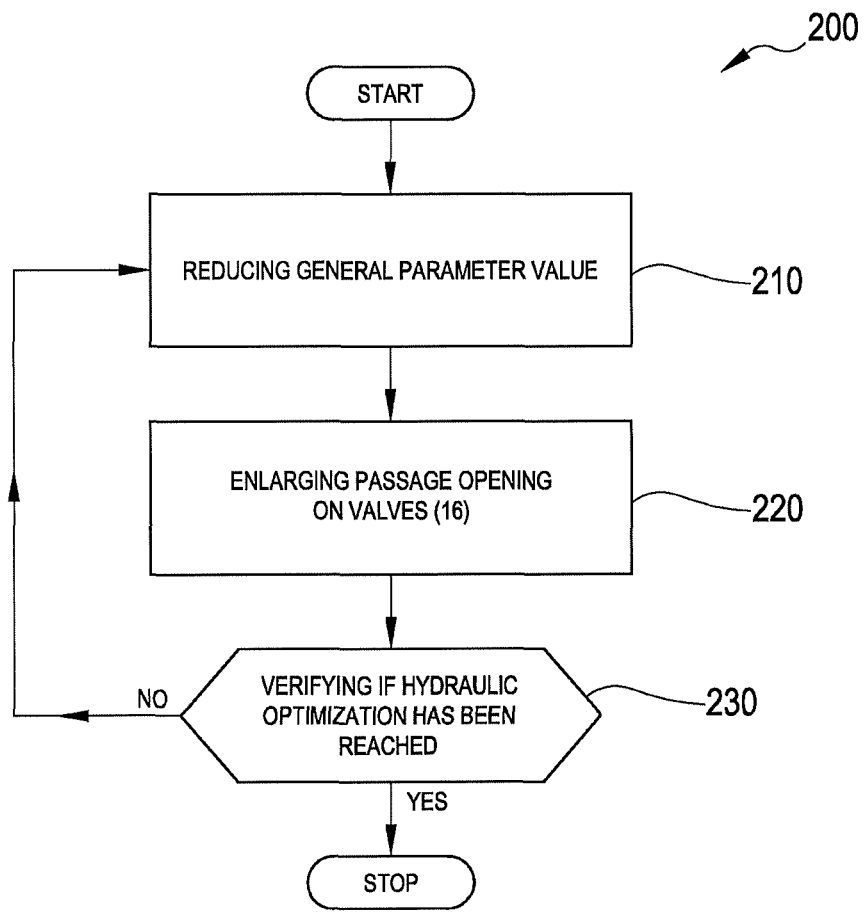

Subsequently, the controlling process can comprise to execute the step of the above described controlling process with reference to FIG. 9 and, therefore, to execute a hydraulic optimization cycle (block 200) having at least the following steps (the optimization cycle is more particularly illustrated in FIG. 12):
- commanding (step 210 in FIG. 12) the central group to reduce the value of said general parameter,
- controlling (step 220 in FIG. 12) each flow-rate regulator by increasing said passage opening.

In this way, the optimization cycle tries to determine a condition having the smallest overall flow resistance and therefore the lowest energy consumption for supplying the central group 6.

It is observed that the just described two steps 210 and 220, of commanding and controlling respectively, can be executed in times different from each other and can be cyclically repeated:
- before controlling each flow-rate regulator for enlarging said passage opening, and
- then, commanding the central group to reduce the value of said general parameter and maintain the desired value of the respective operative parameter, or
- before, commanding the central group to decrease the value of said general parameter and, after the reduction imposed to the value of the general parameter,
- controlling each flow-rate regulator by enlarging said passage opening for maintaining the desired value of the respective operative parameter.

According to an aspect of the invention, the controlling and commanding steps of the optimization cycle are cyclically repeated until it is reached a desired condition of hydraulic efficiency. To this end, the optimization cycle provides a step (step 230 in FIG. 12) of verifying if—after the controlling step on each regulator—the plant has reached a desired hydraulic efficiency condition.

For example, the desired hydraulic efficiency condition comprises one between:
- a condition which a flow resistance less than or equal to a minimum flow resistance through one or more flow-rate regulators corresponds to,
- a condition wherein the passage opening of one or more flow-rate regulators exhibits a maximum opening.

When, following the verifying step, it is determined that the plant has reached the desired hydraulic efficiency condition, the controlling process provides a step of interrupting the hydraulic optimization cycle; viceversa, at least one of the two steps 210 and 220, commanding and controlling respectively, optionally both the steps, are repeated.

For determining if the plant has reached a desired hydraulic efficiency condition, there are possible different alternatives.

In a first option, the step of verifying if a desired hydraulic efficiency condition has been reached, comprises:
- receiving the signal of said position sensor 22 in relation to each of said flow-rate regulators 8,
- verifying, based on said signal of the position sensor 22, an opening state of the intercepting element 20 of each of said valves 16,
- determining when the passage opening of a predetermined number of said valves 16 reaches a maximum opening condition of the passage opening,
- establishing that the desired hydraulic efficiency condition has been reached when one or more of said valves reaches the maximum opening condition of the respective passage opening.

In a second option, the steps of verifying if a desired hydraulic efficiency condition has been reached, comprises:
- receiving for each channel from the respective hydraulic sensor 10, the pressure difference passing through the calibrated orifice or between the sections 5c and 5d (if the hydraulic sensor is a pressure differential sensor) or determining for each channel said pressure difference based on signals supplied by two distinct respective pressure sensors (if the hydraulic sensor comprises two sensors distinct from each other),
- determining when, for a predetermined number of said channels, the pressure difference reaches a predetermined minimum pressure differential value,
- establishing that the desired hydraulic efficiency condition has been reached when for one or more of said channels, the minimum predetermined pressure differential value has been reached.

In a third option, each valve 16 or at least each channel 5 can be provided with at least one pressure switch—actually the hydraulic sensor 10 itself can be a simple pressure switch, in other words a simple switch which emits or interrupts a signal when a threshold usually of a pressure variation has been reached. The pressure switch is configured for emitting a target signal when a pressure difference between the first section 5c of the channel 5 upstream said flow-rate regulator 8 and the second section 5d of the same channel 5 downstream the same flow-rate regulator 8 has reached a predetermined minimum value, or for emitting a target signal when a pressure difference between the first section of a channel 5 upstream the calibrated orifice and the second section of the same channel 5 placed downstream the calibrated orifice has reached a predetermined minimum value. According to this third option, the step of verifying if a desired hydraulic efficiency condition has been reached comprises:
- determining if said target signal has been received by the respective pressure switch of each channel,
- establishing that the desired hydraulic efficiency condition has been reached when for one or more of said channels, said target signal has been received from the respective pressure switch.

As already mentioned, if the verifying step 230 is negative, in other words if it has been verified that a desired hydraulic efficiency condition has not been reached, the hydraulic optimization cycle provides, for example, to place the intercepting element of one or more of the valves 16, towards a greater opening state, directly or upon an action on the central group 6 destined to regulate a general parameter in order to supply less energy to the carrier fluid, for example in other words less hydraulic head or less thermal energy.

More precisely, according to a variant, the step of adjusting (step 210) at least one general parameter comprises, following an increase of the opening degree of the passage opening of one or more of said valves 16, at least one of the following sub-steps:
- commanding the pump 12 to reduce the hydraulic head across the central group,
- commanding the pump 12 to maintain unchanged the overall flow rate of the carrier fluid,
- commanding the heating unit 13 to reduce the temperature of the delivering and/or returning carrier fluid,
- commanding the refrigerating unit 13 to increase the temperature of the carrier fluid in the delivery and/or return lines.

Figure 13:
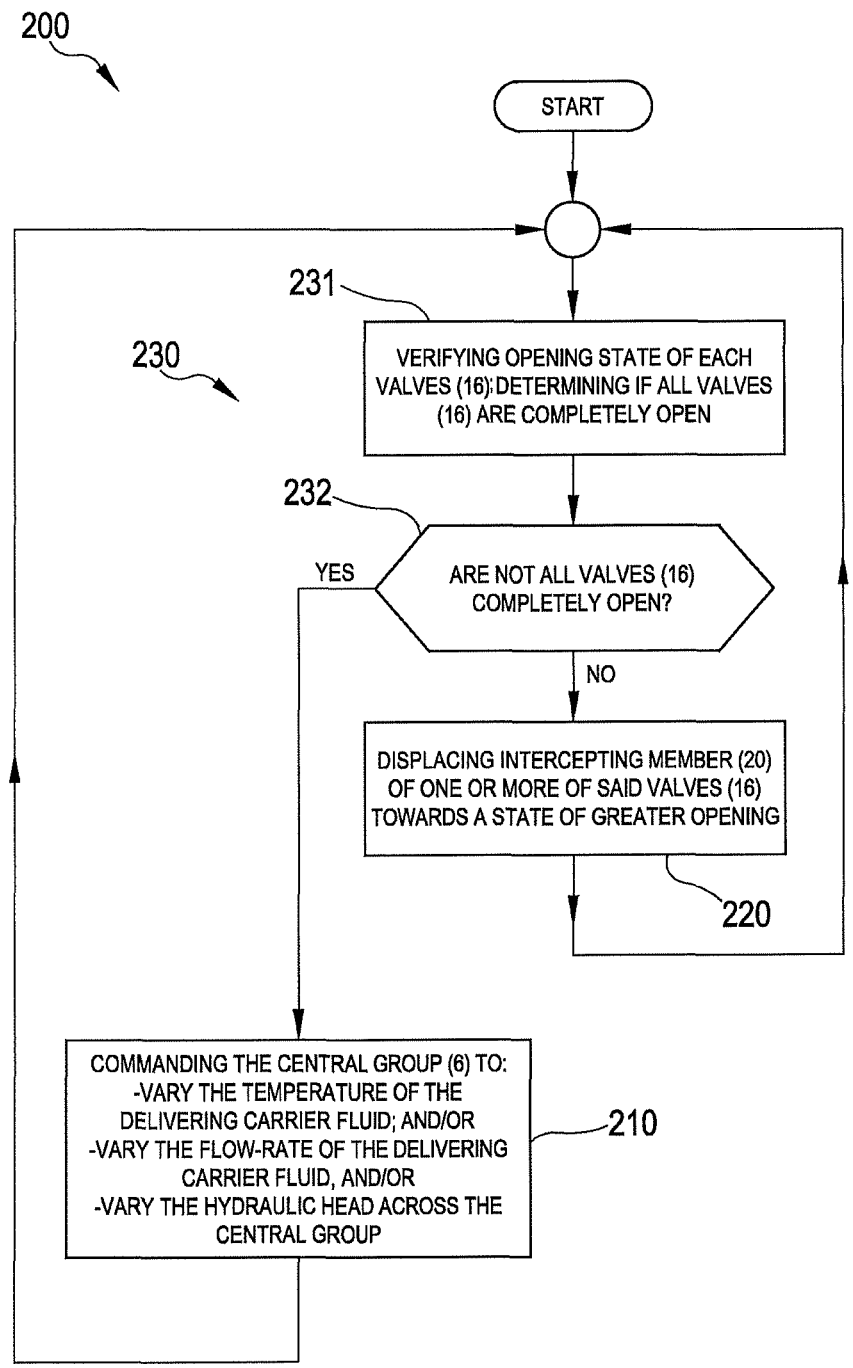

FIG. 13 shows a variant of the optimization cycle using the position sensor 22 for determining the position of each intercepting element 20 in each valve.

The energy optimization cycle comprises the following steps:
- a step of verifying that a hydraulic optimization has been reached (step 230): this step provides, according to this variant of the invention, to verify (sub-step 231), based on the signal of the position sensor 22, an opening state of the intercepting element 20 of each of said valves 16, by determining (sub-step 232) if all the valves 16 are not completely opened,
- if there are no valves 16 completely opened (in other words, if the hydraulic optimization condition has not been reached), the cycle provides to displace (step 220) the intercepting element 20 of one or more of the valves 16 towards a greater opening state.

Then, the cycle can provide to repeat the preceding two steps until one or more of the valves 16 reach a maximum opening state of the respective intercepting element 20.

Before or after the step 220, it can be provided the step of regulating (step 210 in FIG. 13) at least one general parameter by commanding the central group 6. Such step of regulating a general parameter comprises (analogously to what has been previously described and for example following or before an increase of the opening degree of the passage opening of one or more of said valves 16) at least one of the following sub-steps:
- commanding the pump 12 to reduce the hydraulic head across the central group,
- commanding the pump 12 to maintain unchanged the overall flow rate of the carrier fluid,
- commanding the heating unit 13 to reduce the temperature of the delivering and/or returning carrier fluid,
- commanding the refrigerating unit 13 to increase the temperature of the carrier fluid in the delivery and/or return lines.

Also this variant of the optimization cycle can be anticipated or followed by steps of imposing on each channel to comply with the control parameter: in other words, the control unit 24 or device 15 can execute the controlling step by commanding the flow-rate regulators 8 so that the flow rate in each channel (or the thermal power for each heat exchange unit 7) follows values set by the designer, enabling in this way, both at the installation and in anyone situation, to set the flow rates/powers (in other words the operative parameter) in the different branches of the plant, consistent with the setpoints defined by the designer.

Lastly, it is observed that in all the preceding description and in the claims, it is made reference to real or measured values of parameters (of the operative parameter, for example) which are set or controlled in order to follow desired values set by the user or designer; this should be understood with the meaning that for each parameter both point values and, alternatively ranges or acceptance thresholds, can be provided, in which the measured value of a parameter is considered to comply with the desired one.

Advantages of the Invention

The above described plant 1 and controlling process have numerous advantages with respect to the prior art.

The above described plant and conditioning and/or heating process are extremely efficient from the energy point of view since they make the plant capable of satisfying the required thermal conditions with the lowest energy consumption. De facto, the device 15 (or any other control implementing the process) is capable of precisely controlling the power (energy) released or received by each heat exchange unit 7 and monitoring and automatically adjusting the components of each channel 5 and central group 6 for ensuring a high energy efficiency and compliance with the settings of the user or designer.

Moreover, thanks to the provided sensors, the device 15 is capable of monitoring and controlling the flow rate, thermal head, heat exchange in each channel 5 of the plant.

Thanks to the controlling process and optimization cycle it is possible to reduce at the minimum the flow resistances and therefore to reach an optimal hydraulic condition.

Particularly, the control device 15 is capable of executing:
the management of the plant 1, optimized in real time according to performance parameters and/or strategies of energy efficiency;
the calibration of the plant 1 at the installation (the plant parameters are set consistently to the setpoints defined by the designer) obtainable both in the field and in a location remote from the plant;
the automatic real time reset of the optimal conditions of the plant 1 under each operative condition (resetting the parameters of the plant to the setpoints defined by the designer).

The automatic adjustments executed by the control device 15, and in any case the above described controlling process, make the plant 1 implementation and use highly flexible. De facto, the herein described process and plant can be obtained also by retrofitting old conditioning and/or heating plants.

In the following some typical examples of interventions (retrofits) on a conditioning and/or heating plant manageable by the control device 15 for ensuring a high energy efficiency, are listed.

The manual valves are substituted with the valves 16 which enable to balance the power in each heat exchange unit. De facto, the valves 16, based on a variation of the load of the plant 1, adjust themselves for satisfying at each instant the power requirement of a single heat exchange unit 16.

Moreover, the improvement of the thermal characteristics of a building—for example by substituting the frames or increasing the insulation degrees (thermal wall insulation, substitution of the covering coating, etcetera)—could be easily managed by the plant 1. Based on changed (reduced) required thermal powers, the plant 1 will enable to supply to the single heat exchange unit 7 the really required power. Then, the plant 1 enables to monitor the thermal absorption and therefore to supply data useful for calculating the consumption and therefore the economic return following the ameliorative intervention.

The possible substitution of a heat exchange unit 7 is automatically recognized, by the controlling process, through the control device 15 that, in any case, will try to meet the energy parameters without intervening from the outside. Also in case of an expansion of the plant, the controlling process enables to cope automatically with the variation of the loads due to the addition of one or more branches.

The invention claimed is:

1. A process of controlling a conditioning and/or heating plant, said plant being of a type comprising:
   at least one circuit configured for distributing a carrier fluid, having:
      at least one delivery line of the carrier fluid,
      at least one return line of the carrier fluid, and
      a plurality of channels directly or indirectly connected to said delivery line and return line and configured for supplying said carrier fluid to respective environments to be conditioned and/or heated,
   at least one heat treatment central group placed on the circuit,
   wherein for each of said channels, the plant further comprises:
      at least one respective heat exchange unit operating on each of said channels and configured for supplying a respective environment to be conditioned and/or heated,
      at least one flow-rate regulator operating on each of said channels and configured for regulating a flow-rate of a carrier fluid passing through the respective heat exchange unit, wherein each flow-rate regulator comprises at least one valve having a valve body exhibiting at least one inlet, at least one outlet connected by at least one passage which puts in fluid communication the inlet with the outlet, and at least one fluid intercepting element operating in said passage, said fluid intercepting element defining, cooperatively with the valve body, a fluid passage opening having a size variable as a function of positions taken by the fluid intercepting element in relation to the valve body,
   wherein said controlling process comprises:
      commanding the heat treatment central group to regulate at least one general parameter, the at least one general parameter selected from the group consisting of:
         the hydraulic head imposed to the carrier fluid passing through the heat treatment central group,
         the heating imposed to the carrier fluid passing through the heat treatment central group,
         the cooling imposed to the carrier fluid passing through the heat treatment central group, and
         the flow-rate imposed to the carrier fluid on the delivery line,
      commanding the flow-rate regulator on each of said channels to impose a respective desired value of an operative parameter in relation to each channel where the respective flow-rate regulator is present, and
      executing a hydraulic optimization cycle, the hydraulic optimization cycle comprising at least the following steps:
         commanding the heat treatment central group for reducing the value of said general parameter,
         controlling each flow-rate regulator by increasing the size of said fluid passage opening, verifying if—following the step of controlling each flow-rate regulator—the plant has reached a desired hydraulic efficiency condition where the passage opening of one or more flow-rate regulators exhibits a maximum opening, and following the verifying step, if it is determined that the plant has reached the desired hydraulic efficiency condition, interrupting the hydraulic optimization cycle.

2. The process according to claim 1, wherein:

commanding the heat treatment central group for reducing the value of said general parameter and to maintain the desired value of the respective operative parameter occurs after controlling each flow-rate regulator for increasing the size of said fluid passage opening.

3. The process according to claim 1, wherein:

controlling each flow-rate regulator by increasing the size of said passage opening for maintaining the desired value of the respective operative parameter occurs after commanding the heat treatment central group to reduce the value of said general parameter.

4. The process according to claim 1, wherein said operative parameter is:

a flow parameter in each channel selected from the group consisting of:
  a flow-rate passing through each flow-rate regulator,
  a pressure difference between a first section of the channel upstream of each said flow-rate regulator and a second section of the same channel downstream of the same flow-rate regulator, and
  a pressure difference between a first section of a channel upstream of a calibrated orifice and a second section of the same channel downstream of the calibrated orifice, the calibrated orifice being placed on each channel, upstream of each said flow-rate regulator.

5. The process according to claim 4, wherein commanding the flow-rate regulator is based on the deviation between the desired value and a measured value of the respective operative parameter.

6. The process according to claim 5, wherein said measured value of the respective operative parameter is collected by at least one hydraulic sensor selected from the group consisting of:

a flowmeter configured for detecting the flow rate passing through the flow-rate regulator, a pressure differential sensor configured for detecting the pressure difference between a first section of the channel upstream of said flow-rate regulator and a second section of the same channel downstream of the same flow-rate regulator, a pressure differential sensor configured for detecting the pressure difference between a first section of a channel upstream of a calibrated orifice and a second section of the same channel placed downstream of the calibrated orifice, the calibrated orifice being upstream of the flow-rate regulator, a system of two distinct pressure sensors configured for enabling to calculate the pressure difference between a first section of the channel upstream of said flow-rate regulator and a second section of the same channel downstream of the same flow-rate regulator, and a system of two distinct pressure sensors configured for enabling to calculate the pressure difference between a first section of a channel upstream of a calibrated orifice and a second section of the same channel placed downstream of the calibrated orifice, the calibrated orifice being upstream of the flow-rate regulator.

7. The process according to claim 6, further comprising determining the measured value of the operative parameter based on the detection performed by the hydraulic sensor.

8. The process according to claim 1, wherein the process comprises: determining, by a position sensor and for each flow rate regulator, the positions taken by the intercepting element, along a predetermined operative stroke in relation to the valve body, and transmitting a respective signal by the position sensor, wherein the intercepting element is configured for taking a plurality of positions along said operative stroke corresponding to different opening degrees of said passage opening and wherein said position sensor is configured for emitting a signal at each step of a predetermined amount performed by the intercepting element along the operative stroke.

9. The process according to claim 8, wherein verifying if the plant has reached the desired hydraulic efficiency condition comprises:
  receiving the signal of said position sensor relating to each of said flow-rate regulators,
  verifying, based on said signal of the position sensor, an opening state of the intercepting element of each of said valves,
  determining when the passage opening of a predetermined number of said valves reaches a condition of maximum opening of the passage opening, and
  establishing that the desired hydraulic efficiency condition has been reached when one or more of said valves reach the maximum opening condition of the respective passage opening.

10. The process according to claim 1, wherein the heat treatment central group comprises:

at least one pump, and at least one unit selected between a heating unit and a refrigerating unit, and wherein reducing the value of the general parameter during the hydraulic optimization cycle comprises:

commanding the pump for reducing the hydraulic head across the heat treatment central group if the general parameter is the hydraulic head imposed to the carrier fluid passing through the heat treatment central group, commanding the pump for maintaining unchanged the overall flow-rate of the fluid in the delivery line if the general parameter is the flow-rate imposed to the carrier fluid on the delivery line, commanding the heating unit to reduce the temperature of the delivering and/or returning carrier fluid if the general parameter is the cooling imposed to the carrier fluid passing through the heat treatment central group; or commanding the refrigerating unit to increase the temperature of the carrier fluid in the delivery and/or return line if the general parameter is the heating imposed to the carrier fluid passing through the heat treatment central group.

11. The process according to claim 1, wherein said optimization cycle further comprises:

if it is verified that the plant has reached the desired hydraulic efficiency, comparing, for each of said channels, said desired value of the operative parameter with said effective value of the same parameter, verifying, for each of said channels, if the effective value of the operative parameter deviates more than a predetermined threshold from the desired value of the same parameter, —if, as a result of said comparing step, it results that for a number of channels the effective value of the operative parameter deviates more than a predetermined threshold of the desired value of the same parameter, controlling the heat treatment central group for changing at least one general parameter and reducing the deviation between the effective value of the operative parameter and the desired value of the same parameter, and repeating the preceding three steps until, for each heat exchange unit, the effective value of the operative parameter does not deviate more than a predetermined threshold from the desired value of the same parameter.

12. The process according to claim 1, wherein said operative parameter is an energy parameter relating to the heat exchange unit associated to the respective flow-rate regulator, said energy parameter being selected from the group consisting of:
the thermal power released from the carrier fluid passing through each heat exchange unit,
the thermal power received from the carrier fluid passing through each heat exchange unit,
the heat released by the carrier fluid in a predetermined time interval when passes through each heat exchange unit, and
the heat absorbed by the carrier fluid in a predetermined time interval when passes through each heat exchange unit.

13. The process according to claim 12, wherein said process further comprises:
detecting, with at least one thermal sensor, a measured value of a thermal parameter dependent on the temperature difference between a first section of each channel upstream of said heat exchange unit and a second section of each channel downstream of the same heat exchange unit,
wherein the thermal sensor is selected from the group consisting of:
a first thermal detector configured for detecting the temperature in a first section of each channel upstream of said heat exchange unit and a second thermal detector configured for detecting the temperature in a second section of each channel downstream of the same heat exchange unit, and
a differential thermal sensor connected to the first section of each channel upstream of said thermal exchange unit and to the second section of each channel downstream of the same heat exchange unit and configured for detecting the temperature difference between said first and second sections of each channel.

14. The process according to claim 12, further comprising commanding the flow-rate regulator based on the deviation between a desired value and a measured value of the respective operative parameter.

15. The process according to claim 14, wherein said plant comprises at least one hydraulic sensor selected from the group consisting of:
a flowmeter configured for detecting the flow rate passing through the flow-rate regulator,
a pressure differential sensor configured for detecting a pressure difference between a first section of the channel upstream of said flow-rate regulator and a second section of the same channel downstream of the same flow-rate regulator,
a pressure differential sensor configured for detecting a pressure difference between a first section of a channel upstream of a calibrated orifice and a second section of the same channel placed downstream of the calibrated orifice, the calibrated orifice being upstream of the flow-rate regulator,
a system of two distinct pressure sensors configured for enabling to calculate a pressure difference between a first section of the channel upstream of said flow-rate regulator and a second section of the same channel downstream of the same flow-rate regulator, and
a system of two distinct pressure sensors configured for enabling to calculate a pressure difference between a first section of a channel upstream of a calibrated orifice and a second section of the same channel placed downstream of the calibrated orifice, the calibrated orifice being upstream of the flow-rate regulator;
and wherein the process comprises determining the measured value of the operative parameter based on the detection performed by the hydraulic sensor and a thermal sensor.

16. The process of claim 1 wherein, if it is determined that the plant has not reached the desired hydraulic efficiency condition, the hydraulic optimization cycle is repeated.

17. A conditioning and/or heating plant comprising:
at least one circuit, of distributing a carrier fluid, having:
at least one delivery line of the carrier fluid,
at least one return line of the carrier fluid, and
a plurality of channels directly or indirectly connected to said delivery line and said return line, and configured for supplying the carrier fluid to respective environments to be conditioned and/or heated,
at least one heat treatment central group placed on the circuit,
for each of said channels, the plant further comprising:
at least one respective heat exchange unit operating on each of said channels and configured for supplying a respective environment to be conditioned and/or heated,
at least one flow-rate regulator operating on each of said channels, configured for regulating a flow rate of a carrier fluid passing through the respective heat exchange unit, wherein each flow-rate regulator comprises at least one valve having a valve body exhibiting at least one inlet, at least one outlet connected by at least one passage which puts in fluid communication the inlet with the outlet, and at least one fluid intercepting element operating in said passage, said fluid intercepting element defining, cooperatively with the valve body, a fluid passage opening having a width variable as a function of positions taken by the fluid intercepting element in relation to the valve body,
at least one control device communicatively connected to and active on each flow-rate regulator and on said heat treatment central group, the control device being configured for executing a controlling process which comprises:
commanding the heat treatment central group to regulate at least one general parameter selected from the group consisting of:
the hydraulic head imposed to the carrier fluid passing through the heat treatment central group,
the heating imposed to the carrier fluid passing through the heat treatment central group,
the cooling imposed to the carrier fluid passing through the heat treatment central group, and
the flow-rate imposed to the carrier fluid on the delivery line,
commanding the flow-rate regulator on each of said channels to impose a respective desired value of an operative parameter in relation to each channel where the respective flow-rate regulator is present, and executing a hydraulic optimization cycle comprising:
commanding the heat treatment central group for reducing the value of said general parameter,
controlling each flow-rate regulator by increasing the size of said fluid passage opening;
verifying if—following the step of controlling each flow-rate regulator—the plant has reached a desired hydraulic efficiency condition where the passage opening of one or more flow-rate regulators exhibits a maximum opening, and
following the verifying step, if it is determined that the plant has reached the desired hydraulic efficiency condition, interrupting the hydraulic optimization cycle.

18. The plant according to claim 17, wherein said operative parameter is a flow parameter in each channel, the flow parameter being selected from the group consisting of:
a flow-rate passing through each flow-rate regulator,
a pressure difference between a first section of the channel upstream each said flow-rate regulator and a second section of the same channel downstream of the same flow-rate regulator, and
a pressure difference between a first section of a channel upstream of a calibrated orifice and a second section of the same channel downstream of the calibrated orifice, the calibrated orifice being placed on each channel, upstream of each said flow-rate regulator;
wherein said plant comprises at least one hydraulic sensor configured for measuring the flow parameter, the at least one hydraulic sensor being selected from the group consisting of:
a flowmeter configured for detecting the flow rate passing through the flow-rate regulator,
a pressure differential sensor configured for detecting the pressure difference between a first section of the channel upstream of said flow-rate regulator and a second section of the same channel downstream of the same flow-rate regulator,
a pressure differential sensor configured for detecting the pressure difference between a first section of a channel upstream of a calibrated orifice and a second section of the same channel placed downstream of the calibrated orifice, the calibrated orifice being upstream of the flow-rate regulator,
a system of two distinct pressure sensors configured for enabling to calculate the pressure difference between a first section of the channel upstream of said flow-rate regulator and a second section of the same channel downstream of the same flow-rate regulator, and
a system of two distinct pressure sensors configured for enabling to calculate the pressure difference between a first section of a channel upstream of a calibrated orifice and a second section of the same channel placed downstream of the calibrated orifice, the calibrated orifice being upstream of the flow-rate regulator,
wherein imposing a respective desired value of an operative parameter relating to each flow-rate regulator comprises commanding the flow-rate regulator based on the deviation between a desired value and a measured value of the respective operative parameter, with the measured value of the operative parameter being determined based on the detection performed by the hydraulic sensor.

19. The plant according to claim 17, wherein the plant comprises, for each flow-rate regulator, a position sensor configured for determining the positions taken by the intercepting element, along a predetermined operative stroke in relation to the valve body, and for transmitting a respective signal, wherein the intercepting element is configured for taking a plurality of positions along said operative stroke corresponding to different opening degrees of said passage opening and wherein said position sensor is configured for emitting a signal at each step of a predetermined amount performed by the intercepting element along the operative stroke;
and wherein verifying if the plant has reached a desired hydraulic efficiency condition comprises:
receiving the signal of said position sensor relating to each of said flow-rate regulators,
verifying, based on said signal of the position sensor, an opening state of the intercepting element of each of said valves,
determining when the passage opening of a predetermined number of said valves reaches a condition of maximum opening of the passage opening, and
establishing that the desired hydraulic efficiency condition has been reached when one or more of said valves reach the maximum opening condition of the respective passage opening.

20. The plant according to claim 17, wherein the heat treatment central group comprises:
at least one pump, and
at least one unit selected between a heating unit and a refrigerating unit,
and wherein reducing the value of the general parameter during the hydraulic optimization cycle comprises:
commanding the pump for reducing the hydraulic head across the heat treatment central group if the general parameter is the hydraulic head imposed to the carrier fluid passing through the heat treatment central group,
commanding the pump for maintaining unchanged the overall flow-rate of the fluid in the delivery line if the general parameter is the flow-rate imposed to the carrier fluid on the delivery line,
commanding the heating unit to reduce the temperature of the delivering and/or returning carrier fluid if the general parameter is the cooling imposed to the carrier fluid passing through the heat treatment central group, or
commanding the refrigerating unit to increase the temperature of the carrier fluid in the deliver and/or return line if the general parameter is the heating imposed to the carrier fluid passing through the heat treatment central group.

21. The plant according to claim 17, wherein said optimization cycle further comprises:
if it is verified that the plant has reached the desired hydraulic efficiency, comparing, for each of said channels, said desired value of the operative parameter with said effective value of the same parameter,
verifying, for each of said channels, if the effective value of the operative parameter deviates more than a predetermined threshold from the desired value of the same parameter,
if, as a result of said comparing step, it results that for a number of channels the effective value of the operative parameter deviates more than a predetermined threshold of the desired value of the same parameter, controlling the heat treatment central group for changing at least one general parameter and reducing the deviation between the effective value of the operative parameter and the desired value of the same parameter, and repeating the preceding three steps until, for each heat exchange unit, the effective value of the operative parameter does not deviate more than a predetermined threshold from the desired value of the same parameter.

22. The plant according to claim 17, wherein said operative parameter is an energy parameter relating to the heat exchange unit associated to the respective flow-rate regulator, said energy parameter being selected from the group consisting of:

the thermal power released from the carrier fluid passing through each heat exchange unit, the thermal power received from the carrier fluid passing through each heat exchange unit, the heat released by the carrier fluid in a predetermined time interval when passes through each heat exchange unit, and the heat absorbed by the carrier fluid in a predetermined time interval when passes through each heat exchange unit;

wherein said plant comprises at least one thermal sensor configured for detecting a measured value of a thermal parameter dependent on the temperature difference between a first section of each channel upstream of said heat exchange unit and a second section of each channel downstream of the same heat exchange unit, wherein the thermal sensor is selected between:

a first thermal detector configured for detecting the temperature in a first section of each channel upstream of said heat exchange unit and a second thermal detector configured for detecting the temperature in a second section of each channel downstream of the same heat exchange unit, and a differential thermal sensor connected to the first section of each channel upstream of said thermal exchange unit and to the second section of each channel downstream of the same heat exchange unit and configured for detecting the temperature difference between said first and second sections of each channel, wherein said plant comprises at least one hydraulic sensor selected from the group consisting of:

a flowmeter configured for detecting the flow rate passing through the flow-rate regulator, a pressure differential sensor configured for detecting a pressure difference between a first section of the channel upstream of said flow-rate regulator and a second section of the same channel downstream of the same flow-rate regulator, a pressure differential sensor configured for detecting a pressure difference between a first section of a channel upstream of a calibrated orifice and a second section of the same channel placed downstream of the calibrated orifice, the calibrated orifice being upstream of the flow-rate regulator, a system of two distinct pressure sensors configured for enabling to calculate a pressure difference between a first section of the channel upstream of said flow-rate regulator and a second section of the same channel downstream of the same flow-rate regulator, and a system of two distinct pressure sensors configured for enabling to calculate a pressure difference between a first section of a channel upstream of a calibrated orifice and a second section of the same channel placed downstream of the calibrated orifice, the calibrated orifice being upstream of the flow-rate regulator;

wherein imposing a respective desired value of an operative parameter relating to each flow-rate regulator provides to command the flow-rate regulator based on the deviation between a desired value and a measured value of the respective operative parameter, and wherein determining the measured value of the operative parameter is based on the detection performed by the hydraulic sensor and thermal sensor.

23. The process of claim 17 wherein, if it is determined that the plant has not reached the desired hydraulic efficiency condition, the hydraulic optimization cycle is repeated.

* * * * *